(12) United States Patent
Ansari et al.

(10) Patent No.: US 12,254,770 B2
(45) Date of Patent: Mar. 18, 2025

(54) SYSTEM AND METHOD FOR DETECTING TRAFFIC POLE VERIFICATION FOR VEHICLES

(71) Applicant: Harman International Industries, Incorporated, Stamford, CT (US)

(72) Inventors: Asadullah Ansari, Karanataka (IN); Sharath Yadav Doddamane Hemantharaja, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 211 days.

(21) Appl. No.: 18/004,022

(22) PCT Filed: Jul. 10, 2020

(86) PCT No.: PCT/US2020/041697
§ 371 (c)(1),
(2) Date: Dec. 30, 2022

(87) PCT Pub. No.: WO2022/010492
PCT Pub. Date: Jan. 13, 2022

(65) Prior Publication Data
US 2023/0267834 A1    Aug. 24, 2023

(51) Int. Cl.
*G08G 1/0967*    (2006.01)
*G08G 1/09*    (2006.01)
(Continued)

(52) U.S. Cl.
CPC ....... *G08G 1/096725* (2013.01); *G08G 1/092* (2013.01); *G08G 1/09623* (2013.01); *H04L 9/088* (2013.01); *H04L 9/30* (2013.01)

(58) Field of Classification Search
None
See application file for complete search history.

(56) References Cited

U.S. PATENT DOCUMENTS 11,961,310 B2 * 4/2024 Ansari ................. H04L 9/0825
2015/0377634 A1 * 12/2015 Atsmon ............ G01C 21/3602
701/462

(Continued)

OTHER PUBLICATIONS

ISA European Patent Office, International Search Report Issued in Application No. PCT/US2020/041697, Mar. 3, 2021, WIPO, 2 pages.

*Primary Examiner* — Aniss Chad
*Assistant Examiner* — Jennifer M Anda
(74) *Attorney, Agent, or Firm* — McCoy Russell LLP

(57) ABSTRACT

Examples are provided for traffic pole verification systems. In one example, a traffic detection system in a vehicle includes a navigation sensor, a communication system, a processor, and a storage device storing instructions executable by the processor to determine a current location information of the vehicle, obtain a referring traffic pole information based on the current location information, receive one or more of cryptographic pole data and associated cryptographic sign data via the communication system from a transmitter associated with a prospective referring traffic pole including an associated traffic sign mounted thereon; and selectively control one or more vehicle systems of the vehicle based on cryptographic verification of the prospective referring pole using the obtained referring traffic pole information; wherein the cryptographic verification of the prospective referring pole is performed after successful signature verification of the one or more of cryptographic pole data and associated cryptographic sign data.

20 Claims, 11 Drawing Sheets

(51) Int. Cl.
*G08G 1/0962* (2006.01)
*H04L 9/08* (2006.01)
*H04L 9/30* (2006.01)

(56) References Cited

U.S. PATENT DOCUMENTS

2018/0257615 A1* 9/2018 Rawashdeh .......... G06V 20/584
2019/0279007 A1* 9/2019 Zinner ............... G08G 1/09623
2020/0021431 A1* 1/2020 Mondello ............... H04W 4/40

* cited by examiner

SYSTEM AND METHOD FOR DETECTING TRAFFIC POLE VERIFICATION FOR VEHICLES

CROSS REFERENCE TO RELATED APPLICATIONS

The present application is a U.S. National Phase of International Application No. PCT/US2020/041697, entitled "SYSTEM AND METHOD FOR DETECTING TRAFFIC POLE ATTACKS FOR VEHICLES", and filed on Jul. 10, 2020. The entire contents of the above-listed application are hereby incorporated by reference for all purposes.

FIELD

The disclosure relates to traffic pole verification in vehicles, including the use of computer vision systems and cryptographic data transmission.

BACKGROUND

Intelligent transportation systems (ITS), a component of the ongoing evolution of smart cities, may be used in decision making in traffic planning and traffic management. Cars, traffic lights, drivers, sensors, roadside units, and other public infrastructures form a complex networked system of systems. ITS-based applications may include optimal traffic signal control, safe intersection crossing, and emergency warning notifications, with the goals of enhancing travel efficiency, public safety, emergency response, and even disaster recovery. As the building blocks of an ITS, smart traffic lights, signals, and/or signs are increasingly used in traffic management. Some vehicles, such as autonomous or semi-autonomous vehicles, may utilize imaging systems to detect traffic lights, signals, and/or signs and adjust vehicle operation accordingly. The traffic infrastructure is generally complex and often includes multiple traffic poles to regulate the vehicular movements from multiple directions using singular or multiple signs.

SUMMARY

The disclosure provides mechanisms for performing real-time detection and recognition of traffic poles as well as traffic lights, signals, and/or signs with robust authentication and verification of detected data to address data security. For example, in order to distinguish legitimate traffic signs from fake sign signals, such as those displayed by hacking existing traffic signal control systems, cryptography associated signal verification mechanisms may be employed. However, a challenge for the cryptography associated signal verification mechanisms, recognized by the inventors, is ambiguity in understanding which traffic pole to refer to when multiple traffic signs from multiple poles are presented (e.g., due to physical rotation of traffic poles) or when a traffic pole is removed physically thereby resulting in no traffic sign at an intersection. In some examples, aspects of the disclosure provide for a cryptography based traffic pole attack detection system that supplements cryptography based traffic sign verification systems. In some of the disclosed systems, data indicating a traffic pole and data indicating a traffic sign is secured (e.g., encrypted and/or digitally signed) and transmitted to a vehicle. The vehicle verifies the secured data of the traffic pole based on a traffic pole position information obtained using a navigation system of the vehicle to check if the traffic pole transmitting the secured data refers to a lane the vehicle is travelling on. Further, the vehicle verifies the secured data of the associated traffic sign using a recognized sign from a computer vision system in order to check the authenticity of the computer vision-based recognized sign using cryptographic authentication.

In one example of a traffic pole detection system in a vehicle, the system includes a navigation sensor; a communication system; a processor; and a storage device storing instructions in non-transitory memory, the instructions executable by the processor to: determine a current location information of the vehicle, the current location information including a lane information for a travelling lane that the vehicle is travelling on; obtain a referring traffic pole information for the travelling lane based on the current location information of the vehicle; receive cryptographic pole data via the communication system from a transmitter associated with a prospective referring traffic pole including an associated traffic sign mounted thereon, the cryptographic pole data including a cryptographic representation of the prospective referring traffic pole; and selectively controlling one or more vehicle systems of the vehicle based on cryptographic verification of the prospective referring pole using the obtained referring traffic pole information.

In an example of a method of verifying a traffic pole with a vehicle, the method includes determining a current location information of the vehicle; capturing an image of an environment of the vehicle via an image sensor; obtaining a referring traffic pole information of a referring traffic pole based on the current location information of the vehicle; receiving cryptographic information wirelessly via a communication system of the vehicle from a transmitter associated with the traffic pole having a traffic sign mounted thereon, the cryptographic information including a pole cryptographic representation of the traffic pole and a sign cryptographic representation of the traffic sign; and selectively controlling one or more vehicle systems of the vehicle based on a first cryptographic verification of the traffic pole using the pole cryptographic representation and the referring traffic pole information.

An example of a method for identifying a referring traffic pole among two or more traffic poles in a vehicle's environment comprises obtaining a referring traffic pole location information based on a location information of the vehicle and a travelling lane information of the vehicle from a navigation system of the vehicle; obtaining a private key of the referring traffic pole based on the referring traffic pole location information; receiving corresponding cryptographic pole data from each of the two or more traffic poles via a wireless communication system of the vehicle; decrypting each of the corresponding cryptographic pole data using the private key; identifying the referring pole for the vehicle based on successful decryption of cryptographic pole data from one of the two or more traffic poles; and selectively controlling one or more vehicle systems of the vehicle based on identified referring pole. For example, digital cryptographic signature verification is done on the received cryptographic pole data prior to decryption. After the successful signature verification, decryption is performed.

BRIEF DESCRIPTION OF THE DRAWINGS

The disclosure may be better understood from reading the following description of non-limiting embodiments, with reference to the attached drawings, wherein below.

DETAILED DESCRIPTION

The traffic related infrastructure plays a crucial role in achieving the smart mobility through intelligent traffic management which involves mutual communication of the vehicles with the traffic poles, traffic sign boards, traffic handling control stations, other vehicles, etc. in order to achieve the intelligent traffic management involving autonomous vehicles. The addition of the advanced components into the traffic infrastructure to aid the smooth traffic management increases the complexity of the driving infrastructure which expects a clear understanding from the vehicles in order to operate the vehicle to infrastructure (V2I) based intelligent traffic management system.

The advanced traffic infrastructure poses serious perturbation challenges to sensor based traffic sign recognition systems. The existing traffic management systems utilize complex deep learning based traffic sign recognition systems for understanding the traffic infrastructure. However, the complexity challenges are further enhanced by the security for digital systems which are used in both the vehicles and traffic infrastructure. Hence, cryptography based traffic sign recognition system may be employed to harden the existing sensor based systems. However, the physical attacks on traffic infrastructure components (e.g., traffic poles) induces changes to the overall traffic infrastructure which confuses the cryptography based systems. As an example physical world attack on the traffic infrastructure involves the displacement of the traffic sign poles by changing the directions. When a vehicle encounters two traffic poles in a single path, it creates ambiguity in understanding and planning path for the vehicles.

Figure 1:
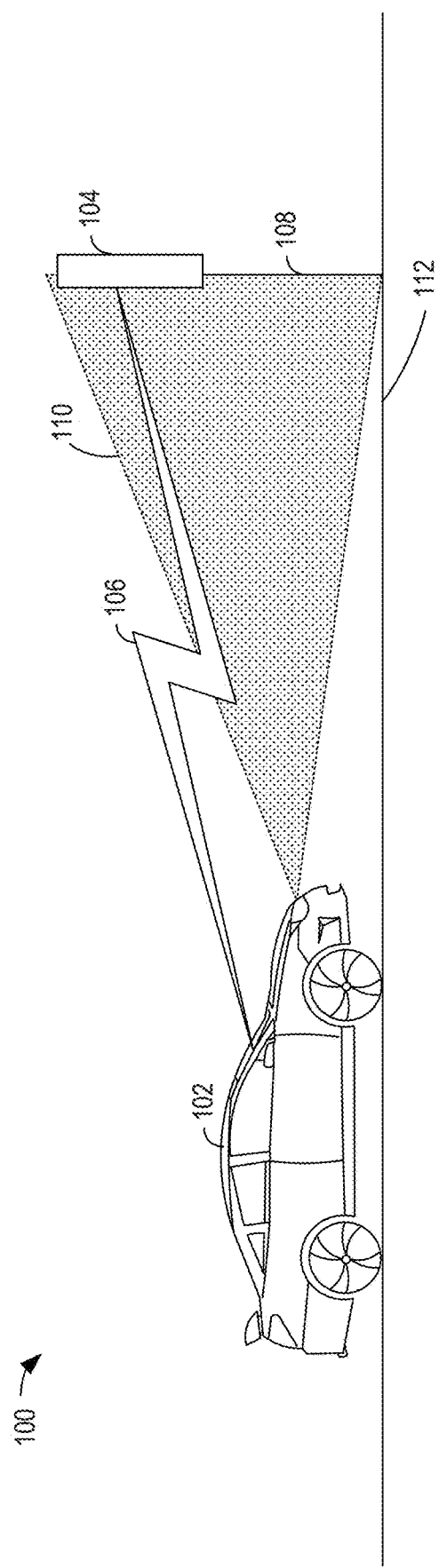
FIG. 1 schematically shows an example environment in which traffic pole and sign detection and verification may be performed in accordance with one or more embodiments of the present disclosure.

The disclosure addresses, at least partially, one or more of the above issues in object recognition systems by detecting traffic pole attacks by utilizing secured communications of traffic pole and signal information for verification purposes. For example, FIG. 1 shows an example environment 100 for performing secured traffic sign detection between a vehicle 102 traveling on a lane 112 and a traffic sign 104 for directing vehicular traffic on the lane 112. As used herein, the term "traffic sign" may be used to denote a traffic signal, a traffic light, a traffic sign, and/or any other indicator that may be used in a traffic scenario to control and/or inform vehicles and/or operators on a roadway of a traffic regulation, ordinance, warning, instruction, etc. As used herein, the term "travelling lane" may be used to denote a lane on which a vehicle is travelling.

A traffic sign detection system may include a transceiver, where a transmitter is housed in the traffic sign 104 and/or accessible by the traffic sign 104. The transmitter may emit digital cryptographic information (represented by transmission signal 106) using an antenna which is mounted on a traffic signal pole 108 and/or otherwise mounted on or near the traffic sign 104, and a vehicle receiver receives the digital information using an antenna which is mounted on the vehicle. The digital transmitted information may include a cryptographic representation of the corresponding traffic sign 104 which is displayed on an associated traffic signal display. The cryptographic representation distinguishes the one traffic sign from another using a unique ID which is assigned to each traffic signs separately. In a non-limiting example, when a STOP sign is displayed on the traffic display of traffic sign 104, then the transmitter transmits the cryptographic representation of the unique ID which is assigned to STOP sign.

The digital transmitted information may include a pole cryptographic representation of the corresponding traffic pole 108. The pole cryptographic representation may distinguish one traffic pole from another using a unique pole ID which is assigned to each pole separately. As will be described further below, the pole cryptographic representation may be used to detect if the digital cryptographic information transmitted from the antenna of the traffic pole 108 refers to the travelling lane 112 of the vehicle, and thus, may be used to detect physical position/direction changes (e.g., rotation of poles) to the traffic pole 108 that may cause the traffic pole 108 and the sign 104 mounted thereon to incorrectly direct traffic from a lane other than the travelling lane 112.

The received cryptographic representation of the traffic sign and the received pole cryptographic representation, which are transmitted using the transmitter are received at the vehicle 102 and the cryptographic information is verified inside a vehicular infotainment system/vehicular processor of the vehicle 102. The verification may include verifying the traffic sign recognized by a computer vision system of the vehicle using the received cryptographic representation. For example, the vehicle 102 may include one or more cameras that are configured to image a region of an environment around the vehicle (e.g., represented by field of view 110), where the resulting images are processed to locate traffic signs in the imaged data. Any traffic signs recognized in the imaged data may be used with received cryptographic data in order to verify and/or authenticate a computer vision-recognized traffic sign. Using the above non-limiting example, if the computer vision-based traffic recognition in the vehicle 102 recognizes the traffic sign 104 as a STOP sign, then the vehicle performs a cryptographic authentication of the received signal using information for a STOP ID associated with the computer vision recognized STOP sign. If the cryptographic authentication using the STOP ID is successful, the traffic sign is considered as an authenticated one, otherwise the traffic sign is considered as a fake/false signal.

During some vehicle operating conditions, the vehicle 102 may receive digital cryptographic information from more than one traffic signal and its corresponding pole, and may recognize via computer vision-based traffic recognition more than one traffic sign. During some other operating conditions, the vehicle may receive digital cryptographic information from one traffic signal and recognize the traffic signal by computer vision, however, the traffic pole and signal may be intended for a different lane traffic but may be physically changed to misdirect traffic on lane 112. Thus, the verification may further include verifying the traffic pole 108 in addition to the traffic sign 104 to determine if the traffic sign 104 and pole 108 are intended for the travelling lane 112 and if the traffic sign 104 is to be considered for subsequent vehicle operation. The verification of the traffic pole 108 may be based on identifying a referring traffic pole position using one or more of computer vision based pole recognition and navigation information from the vehicle's navigation system. A referring traffic pole for a travelling lane may be a traffic pole assigned by official authorities to direct traffic on a given travelling lane. In this example, when a vehicle is travelling on the travelling lane 112 and approaching the traffic pole 108 and its associated sign 104, the referring traffic pole directing vehicle 102 on the travelling lane is the traffic pole 108. The identified referring pole position may be used with the cryptographic representation of the traffic pole 108 received by the vehicle to authenticate the traffic pole 108.

For example, a second traffic pole with a second traffic sign mounted thereon and intended for a perpendicular lane (that is, lane perpendicular to lane 112) may be physically changed (e.g., rotated) such that the second traffic pole with the second traffic sign is incorrectly facing the vehicle 102. Thus, the vehicle 102 may receive a second digital cryptographic information from the second traffic sign and pole in addition to digital cryptographic information 106, and the vehicle 102 may recognize the second traffic sign in addition to traffic sign 104. In order to determine which traffic sign is to be considered for subsequent vehicle operation, the vehicle 102 may verify the pole 108 using pole cryptographic representation of the pole 108 and position information of a referring pole intended for the travelling lane 112 based on the vehicle's navigation system; and may verify the second pole utilizing a second pole cryptographic representation of the second pole as well as position information of the referring pole for the travelling lane 112. Since pole 108 is authorized to be referring pole for the travelling lane 112, verification of the pole cryptographic representation of the pole 108 with respect to the referring pole information may be successful whereas verification of the second pole cryptographic representation based on the referring pole information may not be successful. Upon successful authentication of pole 108 with respect to lane 112, traffic pole 108 may be confirmed to be the referring pole for the travelling lane 112 and sign 104 may be considered as authentic for the traffic lane 112, while the second pole may be flagged as rotated pole/physically misplaced pole, and the second sign mounted on the second pole may not be considered authentic for the lane 112.

Figure 6A:
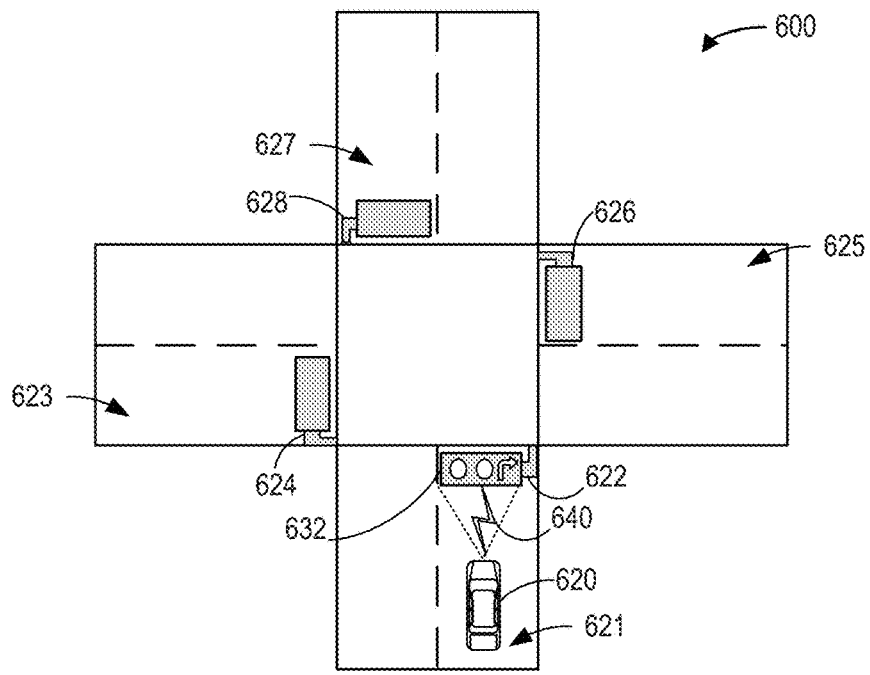
FIGS. 6A-6C schematically shows example traffic intersection scenarios illustrating example identification of a traffic pole in accordance with one or more embodiments of the present disclosure.
Figure 7:
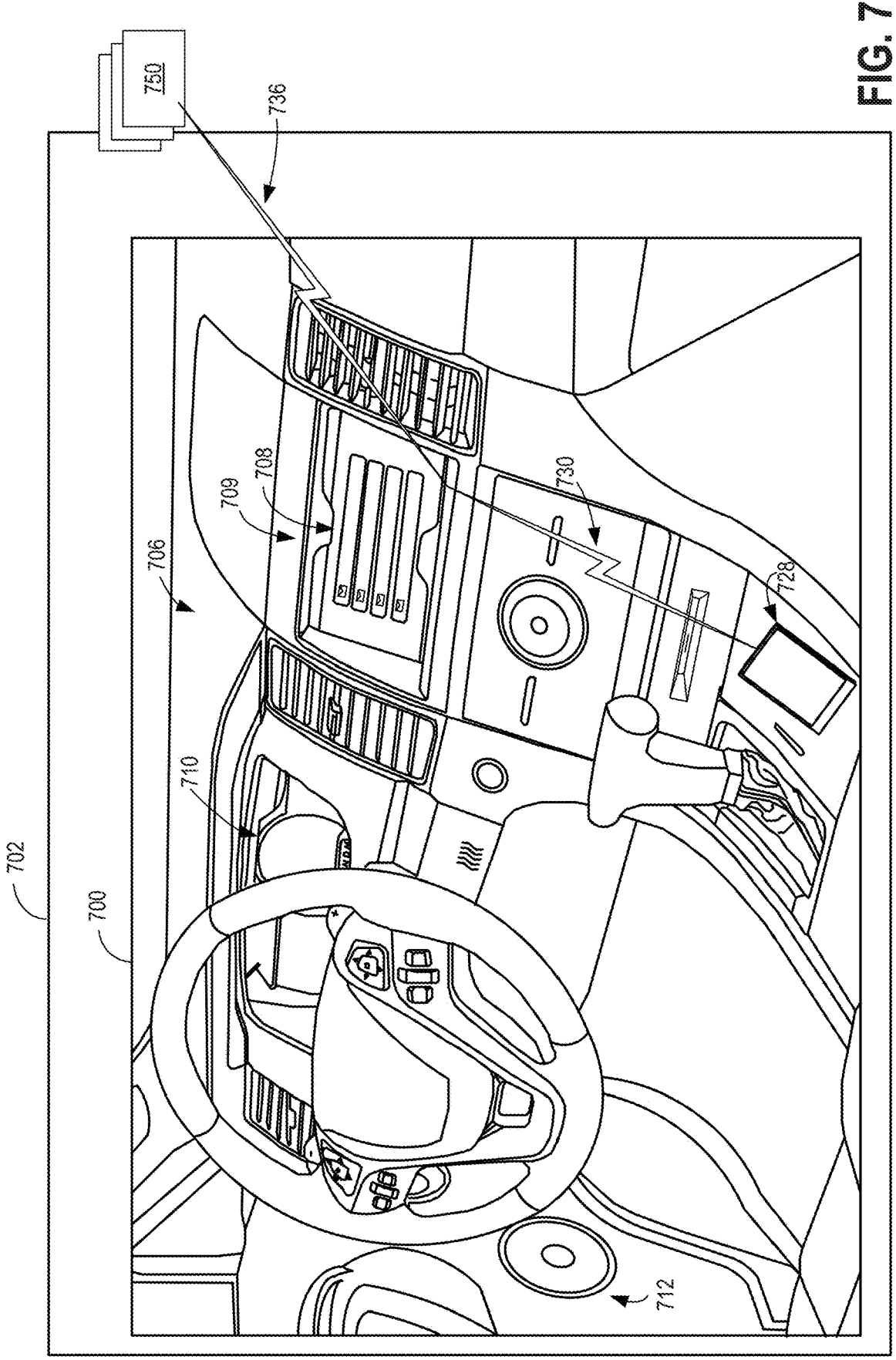
FIG. 7 shows an example partial view of a vehicle cabin in accordance with one or more embodiments of the present disclosure.
Figure 8:
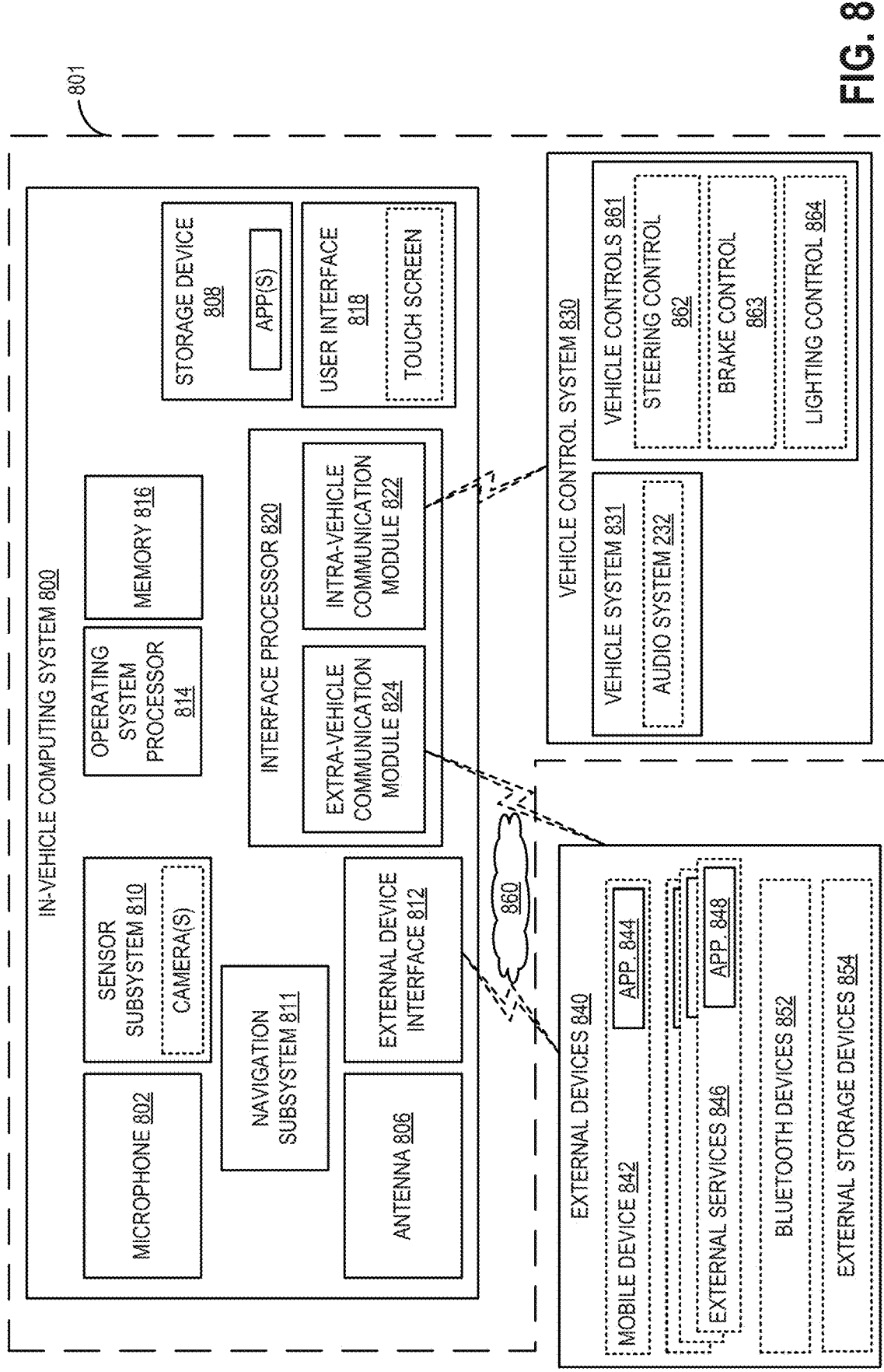
FIG. 8 shows a block diagram of an in-vehicle computing system in accordance with one or more embodiments of the present disclosure.

In this way, by identifying a referring pole position information for a travelling lane of a vehicle using a vehicle navigation system and a cryptographic representation of a traffic pole received from the traffic pole, a vehicle may verify if the traffic pole is intended for its travelling lane, identify if the traffic pole is misplaced/rotated/attacked to misdirect, and discard information from the pole and sign mounted thereon if the pole is not intended for the travelling lane. Example transceiver systems for detecting pole position changes (e.g., due to physical attacks on traffic poles to misdirect traffic on a non-referring lane, due to environmental factors, such as strong wind, that cause a traffic pole to be rotated, etc.) are discussed with respect to FIGS. 2 and 3. The transceiver systems discussed herein may also be used for cryptographic based traffic sign verification. Example methods for generating and transmitting cryptographic representations of a traffic sign and its associated pole, from a transmitting antenna of the traffic sign and the associated traffic pole, are described at FIGS. 4A and 4B respectively. Example methods for receiving and verifying the cryptographic representations of the traffic sign and its associated pole by a vehicle system are discussed at FIGS. 5A and 5B respectively. Further, example use case scenarios for using the transceiver systems described at FIGS. 2 and 3, and the methods at FIGS. 4A, 4B, 5A, and 5B, for detecting traffic pole attacks and verifying traffic signs are discussed at FIGS. 6A-6C. An example vehicle infotainment system, and example in-vehicle computing and control systems that may be utilized for cryptographic verification of traffic signs and its associated pole are illustrated at FIGS. 7 and 8 respectively.

Figure 2:
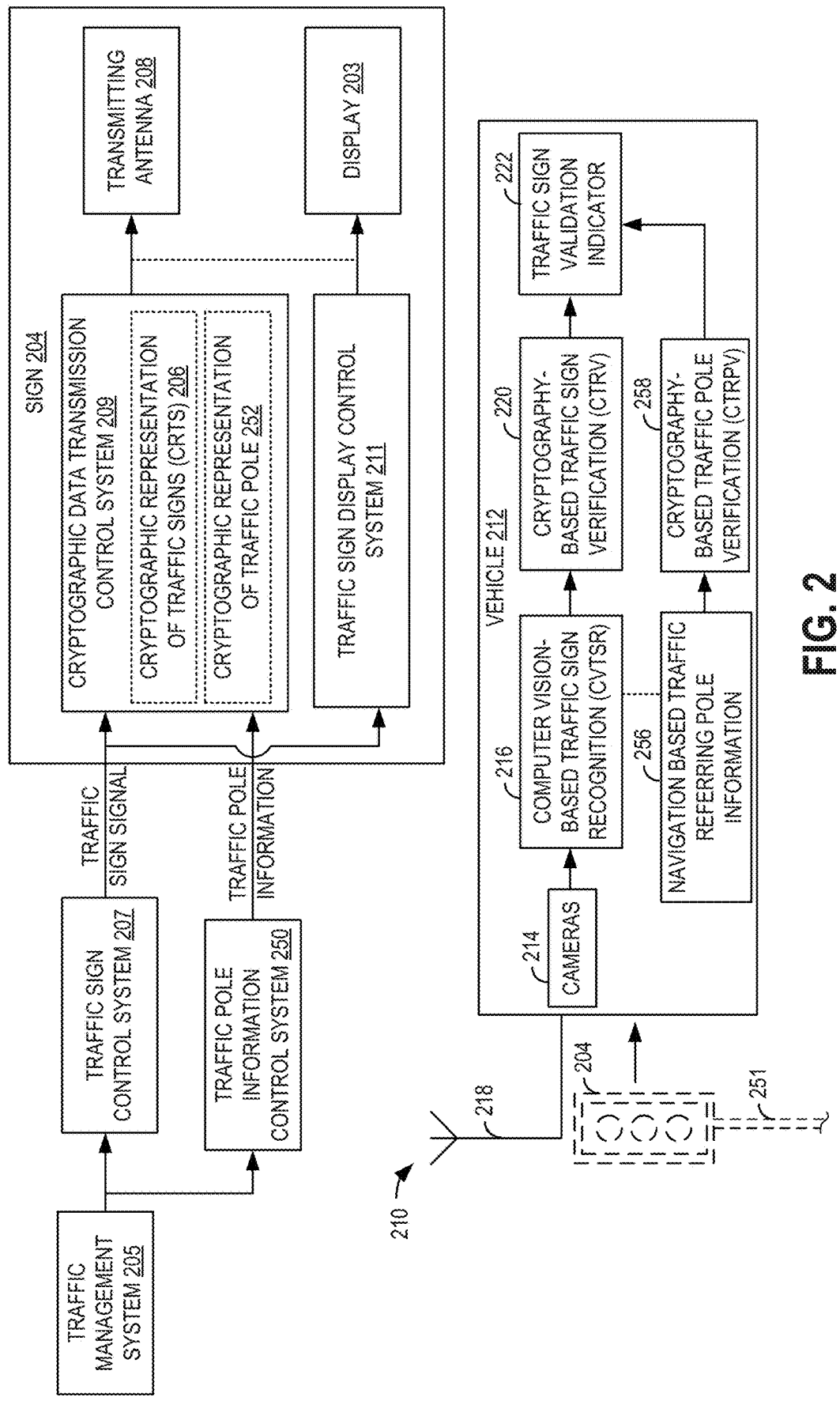
FIG. 2 shows an example traffic pole and sign verification transceiver system in accordance with one or more embodiments of the present disclosure.

FIG. 2 shows a block diagram of an example transceiver system 200. A transmitter portion 202 of the transceiver system 200 includes a traffic sign 204, which displays, via display 203, a traffic indicator to control the flow of traffic (e.g., a stop light/sign, a yield sign, etc.) and/or inform vehicle operators of a traffic/roadway parameter (e.g., an alert or advisory, a regulation such as a speed limit, etc.). The traffic sign 204 may be controlled via a traffic management system 205 (e.g., an official traffic authority, which may be a governmental entity in some examples). For example, an authorized personnel member and/or an authorized automated controller may provide input to and/or via the traffic management system 205 that is directed to a traffic sign control system 207 and used to generate a traffic sign signal indicative of a desired output for traffic sign 204. The desired output may refer to a displayed output for variable signs (e.g., signs that may be controlled to display different sign designations) and/or to a printed and/or manufactured output (e.g., a shape, color, text, or other parameter of a sign) for static signs.

Further, the traffic management system 205 may input, via traffic pole information control system 250, updated information of traffic poles. The updated information of traffic poles may include geographical location information (also referred to herein as location information) of each traffic pole and a lane reference information indicating which lane or lanes a given traffic pole is referring to. Said another way, the lane reference information indicates which lane (or lanes) a given traffic pole with traffic sign mounted thereon is intended to direct. The updated information of traffic poles may be updated and managed periodically to include latest location information and lane reference information for each pole. Thus, before transmission, the traffic pole information control system 250 contains the updated information about the location information of all the traffic poles as well as the corresponding lane reference information (that is, information regarding which lane they are referring to). For example, when a vehicle is moving in a specific lane (that is, travelling lane), the traffic pole information control system 250 may indicate which traffic pole is assigned to the travelling lane. This information in the traffic pole information control system 250 is distributed across all the traffic poles and is available to all moving vehicles.

The traffic sign 204 may include and/or be in communication with a computing device that is configured to provide a cryptographic representation of traffic signs (CRTS) and/or to control a display of the traffic sign. For example, the traffic sign 204 may include and/or be in communication with a cryptographic data transmission control system 209, including a CRTS module 206, which may include a processor and memory having instructions stored thereon to provide the cryptographic representation of traffic signs. In this way, the CRTS module 206 may be configured to generate a cryptographic representation of a traffic sign signal that is received from the traffic sign control system 207.

The traffic sign 204 may include and/or be in communication with a computing device that is configured to provide a cryptographic representation of traffic pole (CRTP). For example, the traffic sign 204 may include and/or be in communication with a cryptographic data transmission control system 209, including a CRTP module 252, which may include a processor and memory having instructions stored thereon to provide the cryptographic representation of a traffic pole on which the traffic sign 204 is mounted. In this way, the CRTP module 252 may be configured to generate a cryptographic representation of updated information of the traffic pole (on which the traffic sign 204 is mounted) that is received from the traffic pole information control system 250.

The cryptographic data transmission control system 209 may be in communication with a transmitting antenna 208 that wireless transmits and/or broadcasts the generated (e.g., digital) cryptographic representation of the traffic sign signal and the generated cryptographic representation of the traffic pole (e.g., at regular intervals and/or responsive to a trigger, such as a request from or detection of a nearby vehicle). Thus, the cryptographic data transmitted (and/or broadcasted) by the transmitting antenna 208 may include both the cryptographic representation of the traffic sign signal and the cryptographic representation of the traffic pole on which the traffic sign is mounted.

The traffic sign 204 may also include and/or be in communication with a traffic sign display control system 211, which may include a processor (or use the same processor as the cryptographic data transmission control system 209) and instructions stored in the memory to generate display control instructions for altering the display 203 of the traffic sign 204 in accordance with the traffic sign signal. For example, the traffic sign signal may be received at the traffic sign display control system 211 and the cryptographic data transmission control system 209 in parallel, such that the generation of the cryptographic representation of the traffic sign signal is performed in parallel with the generation of the display control instructions for controlling the display 203 to display a traffic sign associated with the traffic sign signal. Accordingly, the display 203 may be controlled in parallel with the transmitting antenna 208, such that the cryptographic representation of the traffic sign signal is transmitted in synchronization with the display change (e.g., with no time or phase delays).

As the traffic sign signal changes (e.g., from STOP (RED) to GO (GREEN)), the corresponding cryptographic representation of the traffic sign signal changes, however, the cryptographic representation of the traffic pole remains the same and continues to be transmitted along with each transmission (and/or broadcast) of a cryptographic representation of the traffic sign signal. In this way, pole information as well as traffic sign signal information is transmitted and/or broadcasted from the antenna 208.

A receiver portion 210 of the transceiver system 200 may be incorporated in a vehicle 212 and includes a cascaded combination of computer vision-based traffic sign recognition and cryptography-based traffic sign verification (e.g., where the cryptography-based traffic sign verification uses output from the computer vision-based traffic sign recognition to perform verification of a recognized traffic sign). The computer vision-based traffic sign recognition may be used for an initial detection and recognition of the traffic sign, while the cryptography-based traffic sign verification may be used to perform authentication tasks for traffic sign legitimacy verification. It is to be understood, however, that one or more of the processes performed by the computer vision-based traffic sign recognition may be performed before, after, and/or concurrently with one or more of the processes performed by the cryptography-based traffic sign verification.

For the computer vision-based recognition, the receiver portion includes one or more cameras 214 and a computer vision-based traffic sign recognition (CVTSR) module 216. The cameras 214 each include one or more image sensors mounted on or in the vehicle 212 for imaging an environment of the vehicle. The cameras 214 may include a rear-view camera(s), a front-view camera(s), a side-view camera(s), a camera(s) with a wide field of view (e.g., a camera with a field of view that is greater than 180 degrees), and/or any other suitable camera associated with the vehicle. In addition to being used to image traffic signs, one or more of the cameras 214 may also be used to provide obstacle detection, lane recognition, surround-view imaging for display within the vehicle, and/or other imaging tasks.

The CVTSR module 216 may identify and/or classify traffic signs that are present in images captured by one or more of the cameras 214 using one or more image analysis techniques (e.g., thresholding, edge detection, object classification, etc.). For example, a plurality of objects, shapes, and/or other defining characteristics of traffic signs may be classified and stored in memory that is accessible by the CVTSR module 216 (e.g., local memory in the vehicle and/or memory accessible via a wired or wireless connection, such as a cloud-based storage device). Traffic sign identification and/or classification by the CVTSR module 216 may include utilizing deep learning algorithms and/or otherwise applying machine learning to comparing shapes of detected objects with those shapes already stored in the above-described memory to resolve detected objects as corresponding to associated traffic signs. The CVTSR module 216 may filter the stored traffic signs based on parameters of a detected object such as size, shape, color, location/environmental surroundings, position relative to a road surface, and/or other features of the detected object, which may include text and/or graphical elements displayed by or printed on the detected object. The detected object may be matched to a stored traffic sign based on a score associated with one or more of the traffic signs, each score being a function of an amount of similarity to one or more of the parameters of the stored traffic sign, where each parameter may have an associated weight for each stored traffic sign indicating a relevancy or uniqueness of that parameter to the stored traffic sign. For example, an octagon shape may be primarily used for stop signs, while a rectangular shape may be used for several different signs, such as a speed limit sign, an exit indicator, etc. Accordingly, a matching shape may be weighted more highly for a stop sign than for a speed limit sign. Any of the above factors, including the parameters used for matching and the weighting for each parameter, may be adjusted using machine learning (e.g., using training data in an initial calibration of the system and/or dynamically updating based on responses to real-time traffic sign identifications).

The CVTSR module 216 may also identify traffic poles that are present in the images captured by the one or more cameras 214. The identification of traffic poles may be performed similar to traffic signs discussed above, and will not be repeated for brevity.

The above components may be used to provide an initial recognition of a traffic sign 204 and a traffic pole 251 associated with the traffic sign 204 via computer vision. The initial recognition of the traffic sign 204 may then be used to verify the traffic sign 204 by cryptography-based traffic sign verification components, which include an antenna 218 and a cryptography-based traffic sign verification (CTRV) module 220. The antenna 218 may be configured to receive information, such as the cryptographic representation of a traffic sign signal that is provided to control an output of traffic sign 204 and/or other cryptographic representations of traffic sign signals received from other traffic signs, wirelessly. The received information may be passed to the CTRV module 220 for processing in order to determine a traffic sign associated with (e.g., indicated by) the received information. For example, the CTRV module 220 may perform a verification of the received data (e.g., signature verification), decrypt the received information, and parse the decrypted information to confirm an identity associated with the associated traffic sign. The decrypted information may be compared to a database of traffic sign identifiers (e.g., stored locally at the vehicle and/or in a cloud-based storage device) in order to determine whether the transmitted data was corrupted during transmission (e.g., if the decrypted information matches the stored traffic sign identifier, the data was uncorrupted during transmission). The CTRV module 220 may provide the results of the cryptography-based traffic sign verification to a validated traffic sign indicator 222, which outputs a signal (e.g., to one or more vehicle systems, such as a display controller, a processor, an engine controller, etc.) indicating whether or not the traffic sign recognized by the CVTSR module 216 is valid.

The initial recognition of the traffic pole by the CVTSR module 216 may be used in combination with a navigation based referring traffic pole information determination module 256 to verify the traffic pole 251 by cryptography-based traffic pole verification components, which include the antenna 218, and a cryptography-based traffic pole verification (CTRPV) module 258. The antenna 218 may be configured to receive the cryptographic representation of the traffic pole along with the cryptographic representation of the traffic sign signal wirelessly. The received traffic pole information may be passed to the cryptography-based traffic pole verification (CTRPV) module 258 that also receives referring pole information of a traffic pole that refers to current travelling lane and navigational coordinates of the vehicle from the navigation based module 256 of the vehicle 212. The received traffic pole information from the antenna 218 along with the navigation based referring pole information from the vehicle 212 may be processed in order to determine if the pole information received from a traffic pole corresponds to a traffic pole referring to a traveling lane of the vehicle. For example, the CTRPV module 258 may perform a verification of the received data (e.g., signature verification), and perform a decryption of the received pole information based on navigation based pole information from the vehicle 212 to determine if the traffic pole and signal identified by the vehicle (via computer vision) and transmitting information to the vehicle is referring to the travelling lane of the vehicle. If the decryption is successful, the pole is authenticated, and may be used to further verify the traffic sign. In particular, the CTRPV module 258 may provide the results of the cryptography-based traffic sign verification to the validated traffic sign indicator 222, which outputs a signal (e.g., to one or more vehicle systems, such as a display controller, a processor, an engine controller, etc.) indicating whether or not the traffic sign and pole recognized by the CVTSR module 216 is valid.

For example, if the traffic pole recognized by the CVTSR module 216 is confirmed to correspond to the travelling lane and if the traffic sign recognized by the CVTSR module 216 is indicated to be valid (e.g., if the one or more vehicle systems receive an output from the validated traffic sign indicator 222 indicating a successful decryption of the received cryptographic data followed by an ID comparison with the unique IDs stored locally in the vehicle), the one or more vehicle systems may proceed to control vehicle operation based on the recognized traffic sign (e.g., provide an automated response to the traffic sign, such as outputting an indicator of the traffic sign, adjusting autonomous operation of the vehicle to conform to the regulations and/or traffic control indicated by the traffic sign, etc.). However, if the traffic pole recognized by the CVTSR module 216 does not correspond to the travelling lane, even if the traffic sign recognized by the CVTSR module 216 is valid, the traffic sign signal may be discarded and one or more vehicle systems may not adjust/control vehicle operation based on traffic sign information for a pole that is not referring to the travelling lane. Further, if the traffic pole recognized by the CVTSR module 216 is determined to correspond to the travelling lane, but the traffic sign recognized by the CVTSR module 216 is indicated to be not valid (e.g., if the one or more vehicle systems receive an output from the validated traffic sign indicator 222 indicating that the decryption of the received cryptographic sign data was not successful), the one or more vehicle systems may not alter or control vehicle operations based on the recognized traffic sign. In any case, if the traffic sign is not used for adjusting vehicle operation, the one or more vehicle systems optionally may output a warning to the driver and/or to a traffic authority service to indicate that the traffic sign and/or pole is potentially compromised.

Figure 3:
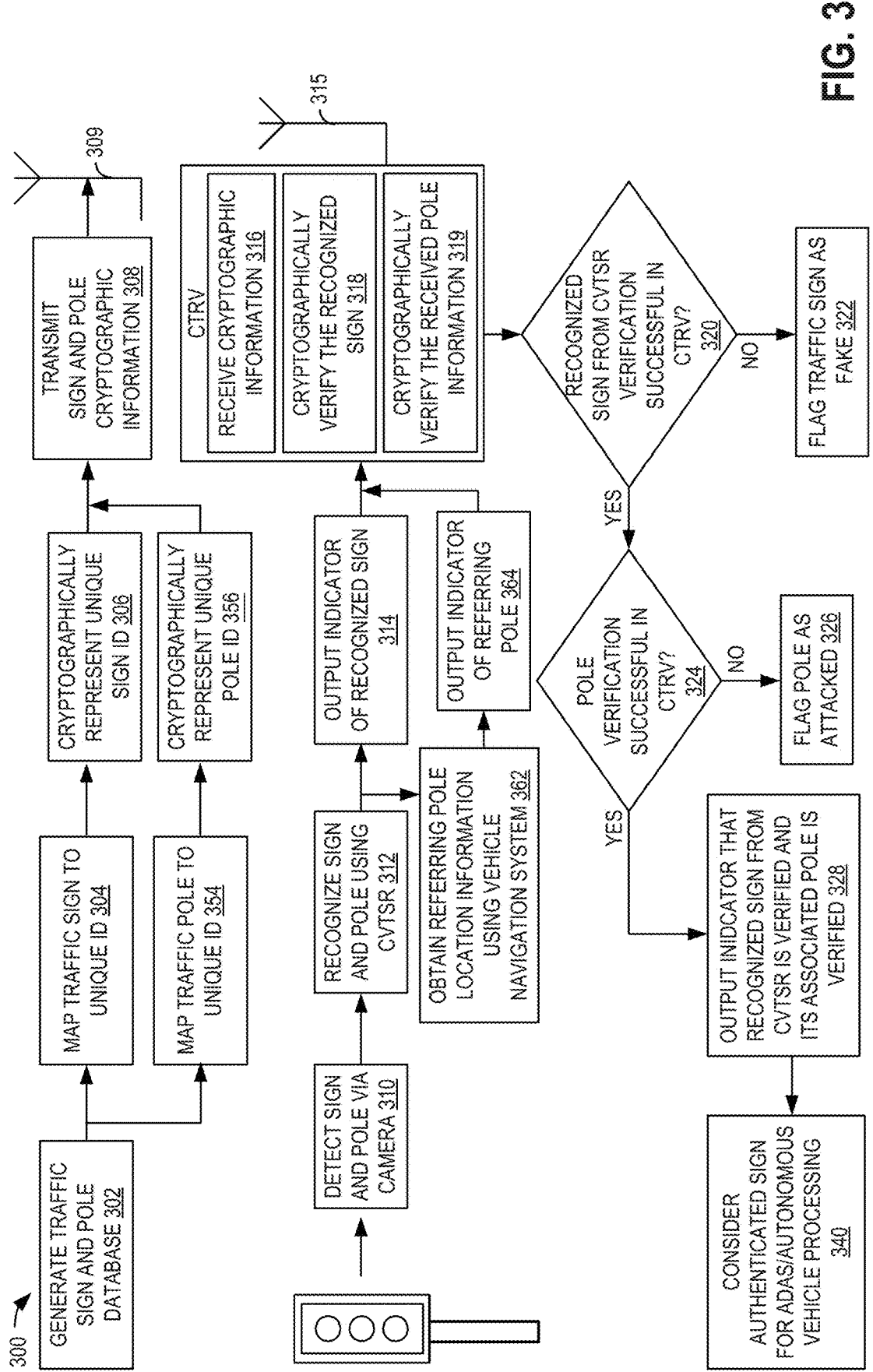
FIG. 3 shows a flow chart of an example method of identifying traffic pole using navigation system and cryptographic data, and identifying traffic signs using computer vision and cryptographic data in accordance with one or more embodiments of the present disclosure.

FIG. 3 shows a flow chart of an example method 300 of performing cryptographic verification of a traffic sign, including cryptographic verification of a traffic pole on which the traffic sign is mounted. For example, method 300 may be performed using the components of the transceiver system 200 of FIG. 2. Method 300 will be described herein with reference to the system and components depicted in FIG. 2, though it should be understood that the method may be applied to other systems and components without departing from the scope of the present disclosure. At 302, the method includes generating a traffic sign and pole database. The traffic sign and pole database may be formed by generating a unique sign ID to each of a plurality of possible traffic signs, and by generating a unique pole ID to each of a plurality of possible traffic poles associated with each of the plurality of possible traffic signs. The traffic sign and pole database may be generated using a centralized service and/or may be generated locally at each transmitter system (e.g., transmitter system 202 of FIG. 2). The traffic sign and pole database may be generated upon initialization of the associated system and/or continuously or periodically updated to refresh an assignment of unique sign and pole IDs. For example, in order to increase security, unique sign and pole IDs may be periodically reassigned, such that traffic signs and associated traffic poles, each have a possibility of receiving a different unique ID periodically. In this way, assigned unique IDs may expire after a threshold period of time that may be predetermined and/or based on a trigger (e.g., an indication that the database may be compromised, such as an indication that a faked traffic sign has been detected, an example of such a detection being described below, an indication that a traffic pole has been rotated, etc.). As described with respect to FIG. 2, the traffic sign and pole database may be stored locally at a transmitter system and/or remotely at a centralized system (e.g., a cloud-based storage device) for access by the transmitter system.

At 304, the method includes mapping a traffic sign (e.g., the traffic sign associated with the transmitter system performing this portion of method 300, such as the transmitter system 202 of FIG. 2) to a unique sign ID using the traffic sign and pole database generated at 302. Further, at 354, the method 300 includes mapping a traffic pole associated with the traffic sign (that is, a traffic pole on which the traffic sign is mounted) to a unique pole ID using the traffic sign and pole database. In order to prepare the unique sign ID and its associated unique pole ID for secure transmission, the method further includes cryptographically representing the unique sign ID, as indicated at 306, and further includes cryptographically representing the unique pole ID, as indicated at 356. As shown, the mapping and cryptographic representation of the unique sign IDs and the unique pole IDs may be performed in parallel. Embodiments where the mapping and cryptographic representation of the unique sign IDs and the unique pole IDs are performed sequentially and in any order, are also within the scope of the disclosure. By encrypting the unique sign ID and its associated pole ID before transmission, the unique ID may only be discoverable to systems that have an associated key for signature verification and decryption (as will be described in more detail below with respect to FIGS. 4A, 4B, 5A, and 5B). In this way, the unique sign ID and its associated unique pole ID may be secured to prevent tampering with the verification process.

Upon cryptographically representing the unique sign ID at 306 and cryptographically representing the unique pole ID at 356, the method 300 proceeds to 308. At 308, the method 300 includes transmitting sign and pole cryptographic information including the cryptographically represented unique sign ID along with the cryptographically represented unique pole ID (e.g., via an antenna 309). The transmission of the cryptographic sign and pole information may be continuous (e.g., via a continuous broadcast) in order to provide a highest degree of availability of the transmitted information. In other examples, the transmission of the cryptographic sign and pole information may be periodic (e.g., via a broadcast that is repeated at regular intervals) in order to provide a high degree of availability while still providing some bandwidth, power, and/or other resource savings relative to the continuous broadcast example.

In still other examples, the transmission of cryptographic sign and pole information may only be performed responsive to a trigger (e.g., responsive to detecting a request for the information from an oncoming vehicle and/or responsive to detecting, with a sensor associated with the transmitter system, an approach of a vehicle that is within a threshold distance of the traffic sign, the threshold distance being based on a range of the sensor in some examples). In the trigger-based example, the system may perform a continuous and/or periodic transmission for a predetermined period of time after detecting the trigger and/or until an exit trigger is detected (e.g., the vehicle is determined to be outside of the threshold distance of the traffic sign and/or is detected as heading away from the traffic sign). Alternatively, in the trigger-based example, the system may perform a predetermined number of transmissions (e.g., one to three transmissions) responsive to the trigger and not perform any additional transmissions until a next trigger is detected. The trigger-based example may provide a highest degree of resource savings relative to the continuous and period broadcast examples by only utilizing transmission resources responsive to a trigger that indicates that a vehicle or driver may be attempting to recognize the associated traffic sign. In each of the above examples of transmission, the data may be transmitted via a wireless communication link according to an associated protocol (e.g., WIFI, WIFI direct, cellular connectivity, BLUETOOTH, Near-Field Communication [NFC], 5G, Vehicular Ad Hoc Networks (VANET) protocol, etc.). For example, the transmission may occur on a proximity-based communication link (e.g., BLUETOOTH, NFC, etc.) in order to target vehicles that are near the traffic sign. Furthermore, in each of the above examples of transmission of cryptographic sign and pole information, the cryptographic sign and pole information may be updated responsive to a change in the traffic sign signal provided by the traffic sign control system (which also causes an associated change in a display of the traffic sign). The updated cryptographic sign and pole information may correspond to an updated unique ID that corresponds to the updated traffic sign signal. In some examples, only the cryptographically represented sign ID may be updated, however the updated cryptographically represented sign ID may be transmitted along with the cryptographically represented pole ID. Similarly, when only the cryptographically represented pole ID is updated (e.g., due to installation of a new pole, a periodic pole ID update, etc.), the updated cryptographically represented pole ID is transmitted along with the cryptographically represented sign ID. Thus, during each transmission and/or broadcast, the cryptographically represented sign ID is transmitted along with the cryptographically represented pole ID.

Turning now to the receiver system side of method 300 (e.g., performed by a vehicle-based system, such as receiver system 210 including vehicle 212 of FIG. 2), the method includes detecting the traffic sign and a traffic pole associated with the traffic sign via a camera, as indicated at 310. For example, the detection at 310 may be performed by imaging a surrounding of the vehicle using camera 214 of FIG. 2. At 312, the method includes recognizing the traffic sign using a CVTSR module (e.g., CVTSR module 216 of FIG. 2). For example, as described above with respect to FIG. 2, the CVTSR module may process images captured by the camera (e.g., including images captured at 310) and identify a traffic sign and a traffic pole associated with the traffic sign in the processed images. At 314, the method includes outputting an indicator of the traffic sign recognized at 312 (e.g., an indicator associated with the identified traffic sign from the processed images). For example, the indicator may be a stored ID that is stored locally in the vehicle and mapped to the recognized traffic sign in the traffic sign database generated at 302, as the stored ID is used in the verification and decryption of received cryptographic information, as will be described in more detail below.

Further, in parallel with obtaining and outputting an indicator of the traffic sign at 314, upon recognizing the traffic sign and its associated pole, the method proceeds to 362. At 362, the method 300 includes obtaining referring pole location information using vehicle navigation system. This includes determining a current travelling lane of the vehicle and navigational coordinates of the vehicle. Further, based on the travelling lane information and navigational coordinates of the vehicle, a referring pole location information for a referring pole that refers to the current travelling lane and navigational coordinates of the vehicle may be obtained. Said another way, the referring pole is a traffic pole that is intended to direct traffic in the current travelling lane and the referring pole location information for the referring pole may be obtained from the travelling lane information and navigational coordinates of the vehicle.

Upon obtaining the referring pole location information, at 364, the method 300 includes obtaining an output indicator of referring pole. The output indicator of the referring pole may be a stored pole ID that is stored locally in the vehicle and mapped to the referring traffic pole in the traffic pole database generated at 302). The stored pole ID is subsequently used on verification and decryption of received cryptographic information, as described in more detail below.

While the method 300 describes obtaining referring pole information using vehicle navigation system after detecting a traffic sign and its associated traffic pole, the vehicle control system may also expect a referring traffic pole at an approaching intersection within a threshold distance ahead of a current vehicle location in a current travelling lane, and if the expected referring pole is not detected by the camera and CVTSR, the vehicle control system may determine that the referring pole and thus an associated sign mounted on it is not present, and may provide an indication (e.g., provide an alert to an operator, an indication to reduce vehicle speed at the approaching intersection, etc.) to the vehicle control system to take cautionary measures at the approaching intersection.

The output indicator of the recognized sign obtained at 314 and the output indicator of the referring pole obtained at 364 may be provided to a CTRV module (e.g., CTRV module 220 of FIG. 2) for recognized sign and received pole information verification respectively. In some embodiments, as shown in FIG. 2, a cryptography base traffic pole verification module, such as the CTRPV module 258, may be used to verify the received pole information based on the referring pole information.

In order to perform the verification of the recognized sign, at 316 the method includes receiving, at the CTRV module, the cryptographic information that was transmitted at 308. At 318, the method includes cryptographically verifying, with the CTRV module, the recognized sign provided via the indicator output at 314. Verifying the recognized sign (e.g., recognized via the CVTSR module at 312) at 318 may include decrypting the cryptographic sign information received at 316 with the stored ID to determine the unique ID transmitted by the transmitter system and determining a traffic sign associated with the unique ID (e.g., based on mapping the unique ID to the traffic sign using the traffic sign database generated at 302 and/or an equivalent traffic sign database).

As discussed above, the cryptographic information transmitted at 308 includes sign cryptographic information as well as pole cryptographic information. Thus, at 316 the received cryptographic information may include the received sign and pole cryptographic information. In particular, the received sign cryptographic information may include cryptographic representation of the unique sign ID and the received pole cryptographic information may include cryptographic representation of the associated pole ID. The recognized sign by the CVTSR module may be verified by the CTRV module using the received cryptographic representation of the unique sign ID and the output indicator of recognized sign as discussed at 318. Further, at 319, the method 300 includes cryptographically verifying the received pole information. In particular, the received pole information (that is, cryptographic representation of the pole ID) may be verified using the output indicator of the referring pole and the cryptographic representation of the received associated pole ID. Verifying the received pole information may include decrypting the received associated pole ID by using the stored pole ID of the referring pole to determine if the pole transmitting the cryptographic pole information refers to the current travelling lane.

The sign verification may further include determining, as indicated at 320, if the traffic sign recognized using the CVTSR module at 312 is valid (e.g., a locally-stored ID associated with the traffic sign recognized using the CVTSR module is usable to extract a private key (associated with the corresponding sign and stored in secured storage backed by a secure operating system) for successfully decrypting the information transmitted at 308. If the verification of the recognized sign from the CVTSR module is not successful (e.g., "NO" at 320), the method includes flagging the traffic sign as a fake, as indicated at 322. In some examples, a verification of the traffic sign may further include consulting additional information sources, such as news sources, police/fire/rescue information sources, weather reports, and/or other information sources, which may identify current conditions near the vehicle and assist with determining a likelihood that a traffic sign is valid. For example, if a traffic sign is determined to indicate that a road is closed and a police scanner is also determined to have reported such a closure, the traffic sign may be likely to be valid. Alternatively, if a traffic sign is determined to indicate a storm in the area, but no such storm is reported in the area via any news and/or weather sources, the traffic sign may be likely to be invalid or inaccurate.

As described above with respect to FIG. 2, flagging the traffic sign as fake may include ignoring the detection of the traffic sign via the CVTSR module such that one or more vehicle systems are not controlled based on the traffic sign recognized via the CVTSR module. In this way, the vehicle operations may be maintained as though no traffic sign was detected by the CVTSR module and when cryptographic information transmitting pole verification is successful (as will be described at 324 below) vehicle operations may be controlled based on a traffic sign indicated by the cryptographic information received at 316 and processed by the CTRV module. In additional or alternative examples, if the traffic sign is flagged as fake and the cryptographic information transmitting pole verification is successful (as will be described at 324 below), some vehicle operations may be maintained, while others are adjusted responsive to the detection of a fake traffic sign (e.g., other traffic signs that are a predetermined distance from the fake traffic sign may be ignored and/or subject to higher levels of scrutiny by the verification system, a display in the vehicle may be altered to output a warning regarding the fake sign, a communication system of the vehicle may be operated to send an indication of the fake sign and associated details to a traffic or law enforcement authority computing system, etc.).

In still further examples, if the traffic sign is flagged as fake and the cryptographic information transmitting pole verification is successful (as will be described at 324 below), vehicle operations may be selectively adjusted to adhere to the regulation and/or information of the traffic sign detected via computer vision or the traffic sign indicated by the data received via the vehicle antenna based on a predicted safety score of the two potential traffic signs. For example, if the traffic sign detected via the camera is identified as a speed limit sign that advertises a 70 mph speed limit, and the unique ID received via the cryptographic data indicates a speed limit sign that advertises a 60 mph speed limit, the vehicle may be adjusted to operate in accordance with the lower speed limit, which may have a higher predicted safety score. Safety scores may be determined based on a variety of parameters, including known regional laws, detected behaviors of neighboring vehicles, detected objects/obstacles near the vehicle, weather, and/or other conditions. Vehicle systems may be operated according to any one or more of the examples above and the prior-described portions of method 300 may be repeated until such time as a traffic sign is verified at 320.

If the CVTSR verification is successful (e.g., "YES" at 320), the method proceeds to 324 to verify if the pole verification was successful in the CTRV. This includes determining if the stored pole ID of the referring pole may be used to decrypt the received cryptographic pole information (e.g., if a private key of the referring pole, which is intended to direct traffic in the current travelling lane, may be used to decrypt a public cryptographic key received by the vehicle). If the answer at 324 is YES, the transmitting pole and the referring pole are the same and the transmitting pole is authentic, and therefore the sign on the transmitting pole corresponds to the current travelling lane and may be considered for ADAS/autonomous vehicle processing. If the answer at 324 is NO, the transmitting pole does not refer to the current travelling lane, and the pole may be flagged as attacked/rotated at 326, and hence information from the transmitting pole and/or the sign (even though the sign was verified) may not be used for ADAS/autonomous vehicle processing. Flagging the pole as attacked/rotated may include ignoring the CVTSR detection of the traffic sign mounted on the flagged pole such that one or more vehicle systems are not controlled based on the traffic sign recognized via the CVTSR module. Flagging the pole as attacked may further include ignoring the cryptographic pole and sign information received at the vehicle from the attacked pole for further processing of the vehicle. In this way, the vehicle operations may be maintained as though no traffic sign was detected by the CVTSR module and no cryptographic information received at 316 for purposes of ADAS/autonomous vehicle processing. In additional or alternative examples, some vehicle operations may be maintained, while others are adjusted responsive to the detection of an attacked pole (e.g., other traffic poles that are a predetermined distance from the fake traffic sign may be subject to higher levels of scrutiny by the verification system, a display in the vehicle may be altered to output a warning regarding the attacked pole, a communication system of the vehicle may be operated to send an indication of the fake pole and associated details to a traffic or law enforcement authority computing system, etc.).

Retuning to 324, if the pole verification and the recognized sign verification is successful, the method proceeds to 328 to output an indicator that the recognized sign from the CVTSR module is verified and the associated pole is the referring pole and thus is authentic for the traffic in the current travelling lane. The method may further include considering the authenticated/verified sign for Automatic Driver Assistance System (ADAS) and/or autonomous vehicle processing, as indicated at 340. For example, as described above, the verified sign may be used to control operations of the vehicle in accordance with the type of traffic sign and associated regulation/warning/indication provided by the verified sign.

Figure 4A:
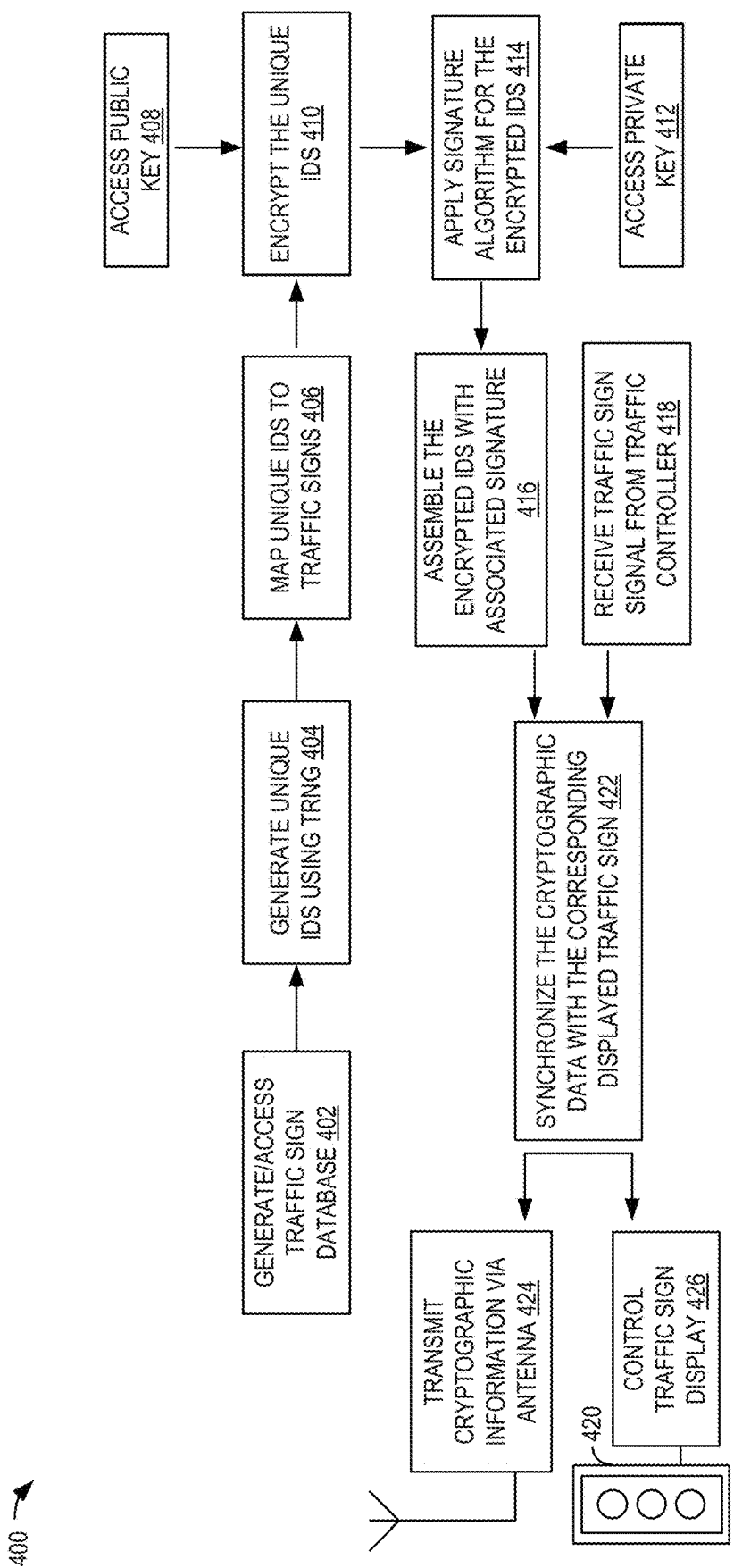
FIG. 4A shows a flow chart of an example method of securing traffic sign data for transmission by a transmitter system in accordance with one or more embodiments of the present disclosure.
Figure 5A:
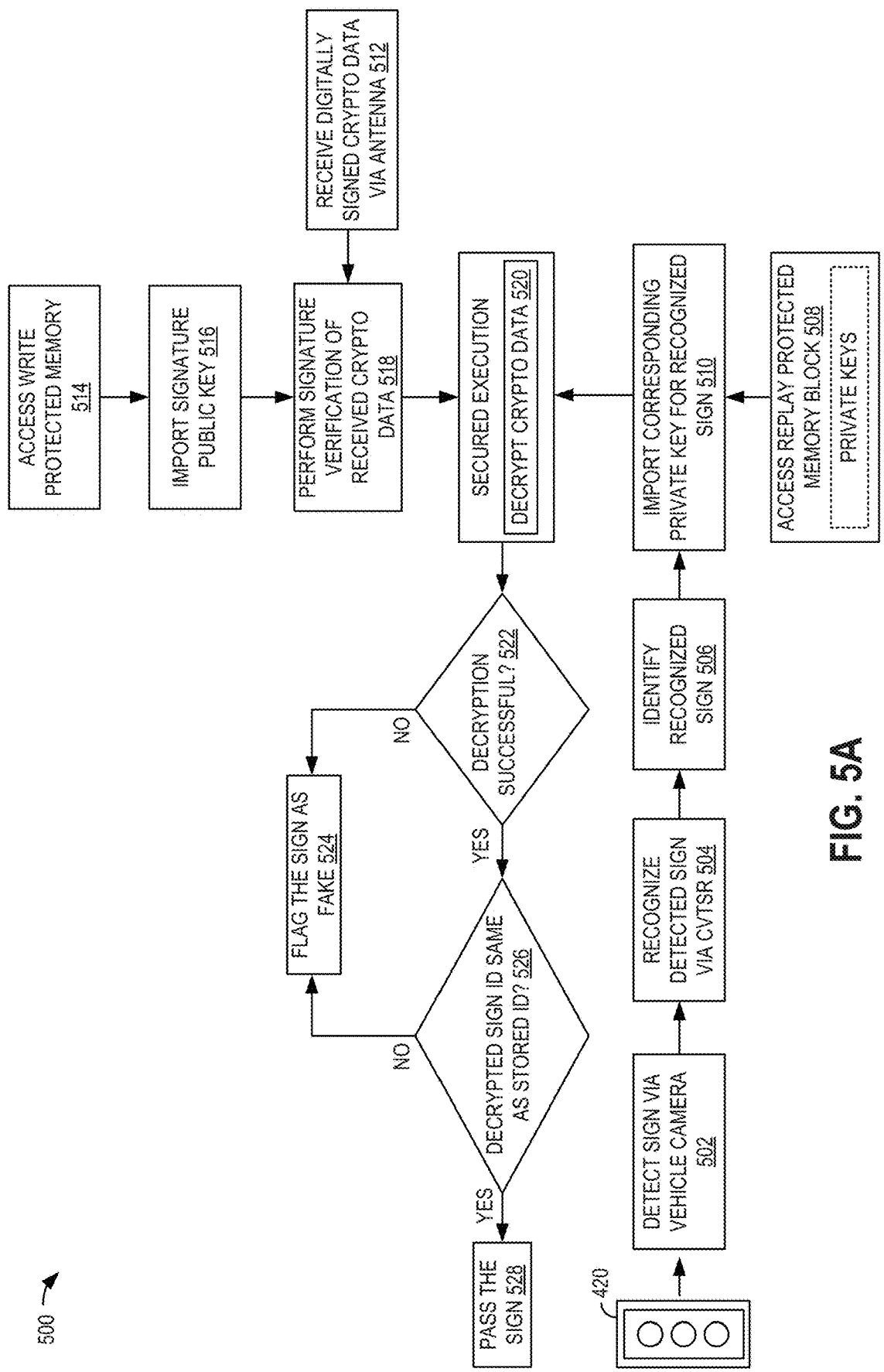
FIG. 5A shows a flow chart of an example method of identifying traffic signs at a receiver system in accordance with one or more embodiments of the present disclosure.

FIGS. 4A and 5A show high level flow charts of example methods 400 and 500 for cryptographic transmission of traffic sign information and cryptographic reception/verification of traffic sign information, respectively. In some examples, method 400 may be performed by a transmitter system associated with a traffic sign, such as transmitter system 202 of FIG. 2, while method 500 may be performed by a receiver system associated with a vehicle, such as receiver system 210 of FIG. 2.

Method 400 includes generating and/or accessing a traffic sign database at 402. For example, all possible traffic signs known to the transmitter system may be collected into the traffic sign database. As described in more detail above, the traffic sign database may be generated locally at the transmitter system and/or remotely (e.g., at a centralized system, such as a cloud-based storage system). Accordingly, operations regarding the generation of the traffic sign database as described herein may be performed at the transmitter system and/or at a remote system. At 404, the method includes generating a unique ID for each traffic sign using a True Random Number Generator (TRNG). It is to be understood that the TRNG generation technique described herein is an example identifier generation technique, and unique IDs may be generated in other manners without departing from the scope of this disclosure.

At 406, the method includes mapping the unique IDs generated at 404 to the traffic signs of the database generated/accessed at 402. In this way, the database generated at 402 may be updated to store, for each traffic sign, an association between the traffic sign (e.g., an initial traffic sign identifier) and a selected one of the generated unique IDs. The mapping performed at 406 may be rule-based (e.g., an association and/or assignment of unique IDs to traffic signs may be determined based on one or more rules) and/or may be random (e.g., determined via a random generation technique).

An encryption of the unique IDs may be performed using public-key cryptography. For example, at 408, the method includes accessing an encryption public key of an encryption algorithm, which is used at 410 to encrypt the unique IDs generated at 404. For example, each unique ID may be transformed to a different value and/or string by applying the public key accessed at 408 to the unique ID according to a selected encryption algorithm (e.g., applying, for each unique ID, a mathematical function in which at least the unique ID and the public key are inputs). The method may also include signing the encrypted unique IDs by accessing a private key (e.g., known only to the transmitter system) at 412 and applying a cryptographic signature algorithm on the encrypted unique IDs (encrypted at 410) using the private key, as indicated at 414. The private key (as well as the public key) may be stored in a proprietary legal traffic signal installation agency.

At 416, the method includes assembling the encrypted unique IDs (encrypted at 410) with the associated signature (applied at 414) in order to generate cryptographic data. In this way, the cryptographic data for each unique ID includes the encrypted unique ID (encrypted using the public key) signed with a digital signature that is based on the private key. In some examples, the digital signature may include a hash of the encrypted unique ID that is in turn encrypted using the private key.

At 418, the method includes receiving a traffic sign signal from a traffic controller, which includes an indication of a traffic sign to be displayed on a traffic sign 420 that is associated with the transmitter system. For example, the traffic sign 420 may include computing elements such as the transmitter system. A processor of the traffic sign may synchronize the cryptographic data with the corresponding displayed traffic sign, as indicated at 422 based on the traffic sign signal received at 418. The synchronization of 422 may be performed in order to select cryptographic data that is associated with (e.g., formed using) the unique ID assigned to the traffic sign to be displayed according to the traffic sign signal. In some examples, there may be an additional layer of security to ensure that the synchronization is only performed for indications of a traffic sign display that originate from changes in the traffic sign performed by authorized sources.

At 424, the method includes transmitting the cryptographic information via an antenna of the transmitter system. For example, the cryptographic information corresponding to the cryptographic data for the unique ID associated with the traffic sign signal from the traffic controller is transmitted at 424. The transmission of cryptographic data may be performed similarly to the transmission described above at 308 of method 300 of FIG. 3. At 426, the method includes controlling the traffic sign display of traffic sign 420 in order to display the sign indicated by the traffic sign signal received at 418. The control of the traffic sign display may be synchronized with the transmission of the cryptographic information so that the display of the traffic sign is changed when the cryptographic information that is transmitted is changed. In this way, the synchronization performed at 422 may generate a signal that is passed to both the display and the antenna without any time delays there between.

An example of pseudo code that may represent operation at the transmitter system is provided below:

```
//Infinite Loop
 1. Traffic sign DB = {Sn1, Sn2...............SnN}
 2. Unique ID = TRNG (x), where ID = {ID1, ID2............IDN}
 3. Assign {Sn1, Sn2..............SnN} = {ID1, ID2............IDN}
 4. Encrypted Sign (ID) = Encrypt (ID, E.Key Pub)
 5. Digital signature (Encrypted Sign (ID)) = Signature algorithm
(Encrypted Sign (ID), S.KeyPri)
 6. Cryptographic sign data = [Encrypted Sign (ID) Digital
signature (Encrypted Sign (ID))], where Cryptographic sign data =
{Cryptographic sign data (ID1), Cryptographic sign data (ID2),
Cryptographic sign data (ID3)........... Cryptographic sign data (IDN)}
 7. Synchronized Cryptographic sign data = Sync (Display_sign,
Cryptographic sign data)
 8. Output = Transmit (Synchronized Cryptographic sign data)
```

Turning now to method 500, a cryptographic reception operation for a vehicle-based receiver system is shown, as described above. At 502, the method includes capturing a traffic sign image using a camera of the vehicle. The capture of the traffic sign image may be performed as described above with respect to the operation of cameras 214 of FIG. 2 and/or the image capture at 310 of method 300 of FIG. 3. At 504, the method includes recognizing the detected sign via a CVTSR module (e.g., as described above with respect to CVTSR module 216 of FIG. 2 and/or the recognition operation at 312 of method 300 of FIG. 3). For example, an external informational image including electronically displayed information that is received at the vehicle may be analyzed to identify the electronically displayed information from a display source (e.g., the traffic sign). The electronically displayed information may include an image, characters, and/or other electronically displayed information presented by the display source (e.g., the traffic sign). Accordingly, an indication of a traffic sign recognized via computer-vision (e.g., a stored ID for the recognized sign stored locally at the vehicle) is identified at 506. The identification may additionally or alternatively include generating a characteristic field (e.g., a character field that includes characters associated with or included in the electronically displayed information, a simplified version of the image/electronically displayed information from the display source, and/or another representation of the electronically displayed information).

At 508, the method includes accessing a replay protected memory block (RPMB) that is local to the vehicle (which stores a plurality of public keys for decrypting received data, each public key representing/corresponding to a different respective possible recognized sign). In order to decrypt and verify the received data, the method further includes importing, at 510, a corresponding private key corresponding to the recognized sign (e.g., the sign recognized at 504, the private key corresponding to the stored ID associated with the recognized sign as identified at 506). For example, unique public key/private key pairs are used in the encryption of unique IDs for different signs, thus, each unique ID is encrypted using a unique public key in the transmitter during encryption, and corresponding unique private keys are used in the receiver (e.g., the vehicle) to perform decryption.

In order to confirm the recognized sign, the vehicle may perform a verification using data that is transmitted by a transmitter associated with the sign. At 512, the method includes receiving digitally-signed cryptographic data via an antenna of the vehicle (e.g., the digitally-signed cryptographic data transmitted at 424 of method 400 of FIG. 4). A signature for each sign is made at the transmitter using a single private key (e.g., the same private key for all signs), thus, a corresponding public key (e.g., that is part of a symmetric public/private key pair for signature verification) is used in signature verification at the receiver. Accordingly, at 514, the method includes accessing write protected memory of the vehicle, and at 516, the method includes importing (e.g., from the write protected memory, which has integrity check associated therewith) a signature public key (e.g., which is handled and/or generated via an original equipment manufacturer) for signature verification.

At 516, the method includes performing signature verification on the received digitally-signed cryptographic data (received at 512) using the imported signature public key. For example, the public key may be applied to the cryptographic data in order to ensure that the received data matches the signed data (e.g., in order to verify that no changes were made to the data after the data was signed). A verification process may include decrypting the signature/digitally-signed cryptographic data using the imported signature public key to generate a decrypted hash, then performing a second computed hash of the same data (e.g., using the same hashing algorithm as the transmitter system) to determine if the second computed hash matches the received digitally-signed cryptographic data. A match indicates that the data was likely not tampered with, while a mismatch indicates that the data was likely compromised.

Unauthorized signals are rejected in the above signature verification, while authorized traffic signals that are successfully verified in the above digital signature verification are passed for decryption. Accordingly, at 520, the method includes decrypting the signature-verified cryptographic data using the private key (imported at 510 from the RPMB based on the computer vision-based sign recognition) in a secured execution mode of a secured operating system in the vehicle. At 522, the method includes determining whether the decryption was successful. For example, identifying successful decryption may include determining whether the private key imported at 510 was able to be used to decrypt the cryptographic data (e.g., indicating that the correct key is retrieved from RPMB for decryption, which in turn indicates that the recognized sign from the computer vision-based traffic sign recognition is correct). If the decryption is not successful (e.g., "NO" at 522), the method includes flagging the detected traffic sign as a fake, as indicated at 524. The flag may be propagated to vehicle systems and/or to third-party systems (e.g., a traffic authority system) as described above with reference to the flagging at 322 of FIG. 3.

Alternatively, if the decryption is successful (e.g., "YES" at 522), the method proceeds to 526 to determine if the decrypted sign ID (e.g., revealed via the decryption performed at 520) is the same as the stored ID stored locally at the vehicle (e.g., the stored ID assigned to the recognized sign that is recognized by the computer vision based sign recognition at 504, which is the same as the ID that is assigned to the corresponding traffic sign at the transmitter side during transmission). Additionally or alternatively, the determination at 526 may include comparing the characteristic field generated based on the CVTSR-based identification of the electronically displayed information from the display source (e.g., the traffic sign) to the cryptographic data received at the vehicle from the display source. The cryptographic data may include cryptographically-secured information including characters of the electronically displayed information (e.g., the traffic sign), a subset of the characters of the electronically displayed information, and/or data representing the electronically displayed information (which may be a simplified or truncated version of the displayed sign in some examples). The comparison of the characteristic field to the cryptographic data may include decrypting the cryptographic data using a key retrieved based on the characteristic field (e.g., as described above with reference to retrieving a key using the stored ID) in order to generate resulting decrypted data. The resulting decrypted data may be compared to the characteristic field in order to determine if there is a match (which indicates a verified sign).

If the decrypted sign ID is not the same as the stored ID (e.g., "NO" at 526, indicating that the sign ID is corrupted), the method proceeds to 524 to flag the sign as a fake, as described above. Alternatively, if the decrypted sign ID is the same as the stored ID (e.g., "YES" at 526, indicating that the sign ID is not corrupted), the method includes passing the authenticated and verified traffic sign to one or more vehicle systems (e.g., passing an identification of the authenticated traffic sign to an ADAS and/or autonomous vehicle processing system for use in controlling the vehicle and/or the one or more vehicle systems), as indicated at 528. For example, if the sign is verified, one or more vehicle systems may be controlled to adhere to a regulation associated with the verified sign (e.g., the electronically displayed information of the verified sign). Otherwise, if the sign is not verified and/or otherwise flagged as a fake, the vehicle system(s) may not be controlled to adhere to the regulation associated with the sign/electronically displayed information.

An example of pseudo code that may represent operation at the receiver system is provided below:

```
//Infinite Loop
  1. Traffic sign image = Camera (Traffic sign pole)
  2. Recognized traffic sign = CVTSR (Traffic sign image)
  3. Received_crypto_data = Receive (Transmit (Synchronized Cryptographic sign data))
  4. S.KeyPub = Import signature key (Integrity check storage (Recognized traffic sign))
  5. Encrypted Sign (ID) = Signature verification algorithm (Received_crypto_data, S.KeyPub)
  6. Sign verification successful
  7. D.KeyPri = Import Decryption Key (Replay Protected Memory Block)
  8. Decrypt (Encrypted Sign (ID), D.KeyPri)
  9. ADAS/Autonomous vehicle operation = Pass (Recognized traffic sign, Decryption successful)
```

Figure 4B:
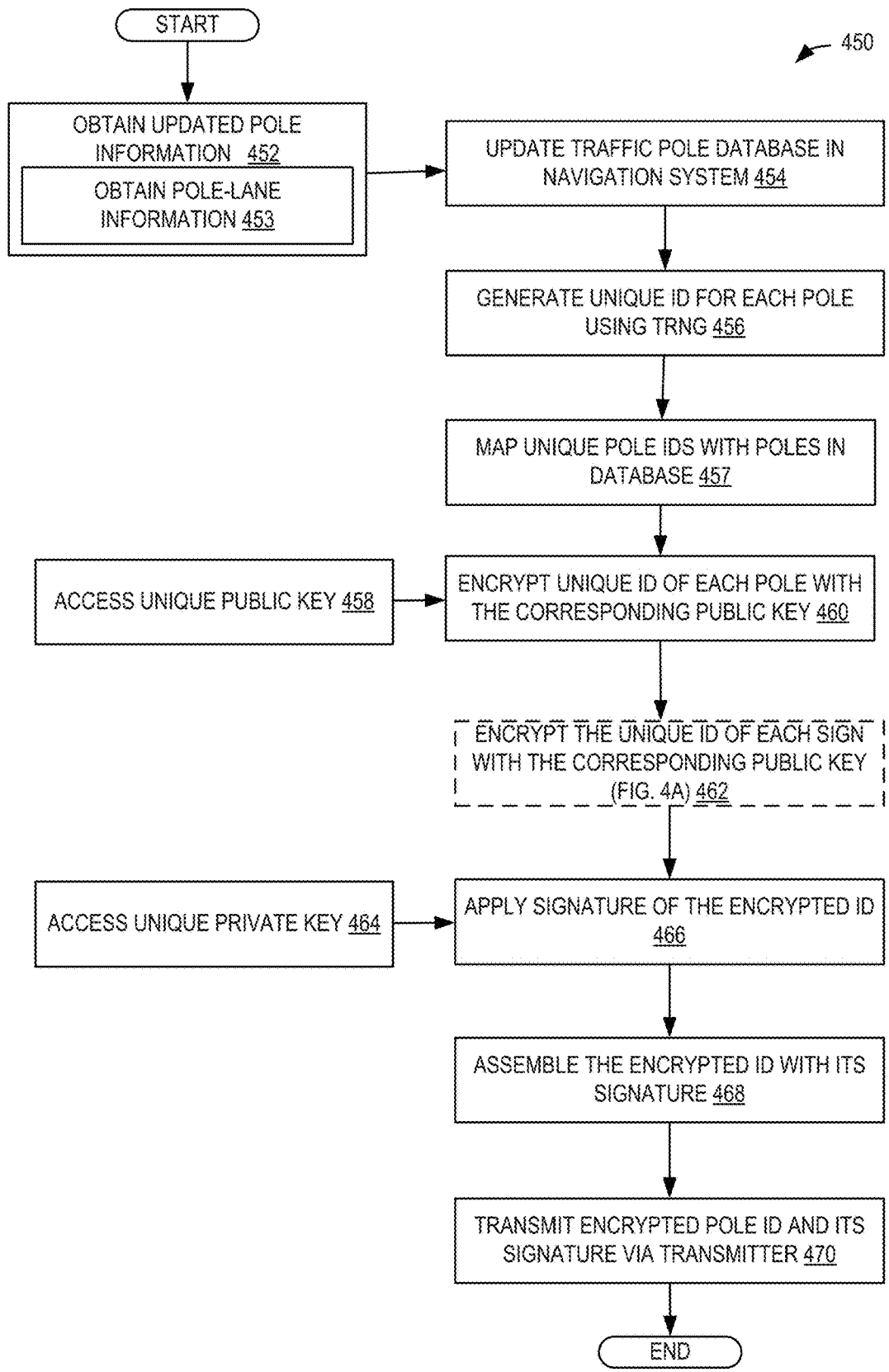
FIG. 4B shows a flow chart of an example method of securing traffic pole data for transmission by a transmitter system in accordance with one or more embodiments of the present disclosure.
Figure 5B:
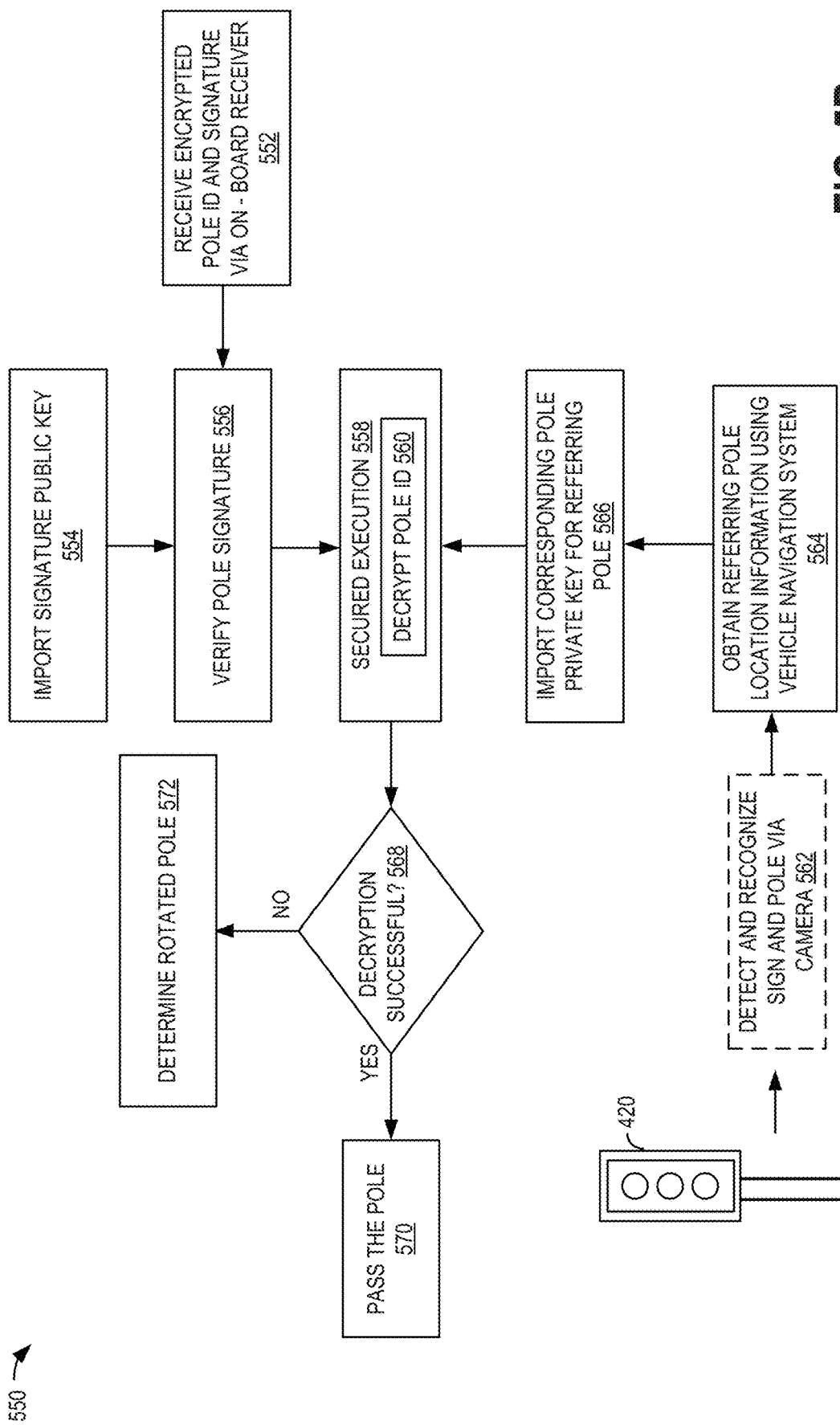
FIG. 5B shows a flow chart of an example method of identifying a rotated traffic pole at a receiver system in accordance with one or more embodiments of the present disclosure.

FIGS. 4B and 5B show high level flow charts of example methods 450 and 550 for cryptographic transmission of traffic pole information and cryptographic reception/verification of traffic pole information, respectively. In some examples, method 450 may be performed by a transmitter system associated with a traffic sign, such as transmitter system 202 of FIG. 2, while method 550 may be performed by a receiver system associated with a vehicle, such as receiver system 210 of FIG. 2.

Method 450 includes obtaining updated pole information at 452. The updated pole information may be obtained from a traffic management system, such as traffic management system 205, which may be maintained and updated by an official authority (e.g., an official traffic authority, which may be a governmental entity in some examples). Obtaining the updated pole information may include, at 453, obtaining updated pole-lane information which includes referring lane information for each of plurality of traffic poles of a traffic pole database, such as traffic sign and pole database 302. For example, all possible traffic poles known to the transmitter system may be collected into the traffic pole database. As described in more detail above, the traffic pole database may be generated locally at the transmitter system and/or remotely (e.g., at a centralized system, such as a cloud-based storage system). Accordingly, operations regarding the generation of the traffic pole database as described herein may be performed at the transmitter system and/or at a remote system.

Next, at 454, the method 450 includes updating the traffic pole database with the updated pole information. At 456, the method 450 includes generating a unique pole ID for each traffic pole using a True Random Number Generator (TRNG). It is to be understood that the TRNG generation technique described herein is an example identifier generation technique, and unique pole IDs may be generated in other manners without departing from the scope of this disclosure.

At 460, the method includes mapping the unique pole IDs generated at 456 to the traffic poles of the database updated/accessed at 454. In this way, the database updated at 454 may be updated to store, for each traffic pole, an association between the traffic pole (e.g., an initial traffic sign identifier) and a selected one of the generated unique IDs. The mapping performed at 406 may be rule-based (e.g., an association and/or assignment of unique IDs to traffic poles may be determined based on one or more rules) and/or may be random (e.g., determined via a random generation technique).

Next, at 460, method 450 includes encrypting the unique pole ID of each pole with a corresponding public key. For example, the encryption of the unique pole IDs may be performed using public-key cryptography. Accordingly, at 458, the method 450 includes for each unique pole ID, accessing an encryption public key of an encryption algorithm, which is used at 450 to encrypt the unique pole IDs generated at 456. For example, each unique ID may be transformed to a different value and/or string by applying the corresponding unique public key accessed at 458 to the unique pole ID according to a selected encryption algorithm (e.g., applying, for each unique ID, a mathematical function in which at least the unique pole ID and the public key are inputs).

Further, at 462, the method 450 includes encrypting a unique sign ID of each sign associated with each pole (that is, the unique sign ID of each sign mounted on a corresponding pole) with a public key generated and accessed for each sign in a traffic sign database, such as the traffic sign and pole database 302. Details of encrypting the sign is discussed above with respect to FIG. 4A.

Upon encrypting each unique pole ID, at 466, the method 450 includes signing each of the encrypted unique IDs by accessing a corresponding unique private key (e.g., known only to the transmitter system) at 464 and applying a cryptographic signature algorithm on the encrypted unique IDs (encrypted at 410) using the unique private key, as indicated at 466. The private key as well as the public key may be stored in a proprietary legal traffic signal installation agency.

Next, at 468, the method 450 includes assembling the encrypted unique pole IDs (encrypted at 460) with the associated signature (applied at 466) in order to generate cryptographic pole data. In this way, the cryptographic pole data for each unique pole ID includes the encrypted unique pole ID (encrypted using the corresponding unique public key) signed with a digital signature that is based on the corresponding unique private key. In some examples, the digital signature may include a hash of the encrypted unique pole ID that is in turn encrypted using the private key.

Next, at 470, the method 450 includes transmitting cryptographic information via an antenna of the transmitter system of the traffic pole. For example, the cryptographic information corresponding to the cryptographic pole data for the unique pole ID associated with the traffic pole from the traffic controller is transmitted at 470. The transmission of cryptographic data may be performed similarly to the transmission described above at 308 of method 300 of FIG. 3. Thus, cryptographic information transmitted may include both cryptographic pole data as well as cryptographic sign data (obtained as described at FIG. 4A). In this way, each traffic pole with an associate traffic sign mounted thereon may encrypt its unique pole ID with a corresponding pole public key and sign the encrypted unique pole ID with a corresponding pole private key, and also encrypt its unique sign ID with a corresponding sign public key and sign the encrypted unique sign ID with a corresponding sign private key. Upon encrypting and signing the encrypted pole and sign unique IDs, the transmitter of the traffic pole and sign may transmit the encrypted and signed unique pole ID along with the encrypted and signed unique sign ID. Further, as discussed above the method includes controlling the traffic sign display of traffic sign in order to display the sign indicated by the traffic sign signal received from a traffic controller (at 418 of FIG. 4A). The control of the traffic sign display may be synchronized with the transmission of the cryptographic information of the sign and pole.

An example of pseudo code that may represent operation at the transmitter system is provided below:

```
//Infinite Loop
  1. Traffic pole DB = {Pn1, Pn2..............PnN}
  2. Unique pole ID = TRNG (x), where pole ID = {pole ID1, pole
ID2............pole IDN}
  3. Assign {Pn1, Pn2..............PnN} = {pole ID1, pole
ID2............pole IDN}
  4. Encrypted Pole (ID) = Encrypt (pole ID, E.KeyPubPole)
  5. Digital signature (Encrypted Pole (ID)) = Signature algorithm
(Encrypted Pole (ID), S.KeyPriPole)
  6. Cryptographic pole data = [Encrypted Pole (ID) Digital signature
(Encrypted Pole (ID))], where Cryptographic pole data =
{Cryptographic pole data (pole ID1), Cryptographic pole data (pole ID2),
Cryptographic pole data (pole ID3)........... Cryptographic pole data
(pole IDN)}
  7. Combined Cryptographic sign and pole data = Assemble
(Synchronized Cryptographic sign data, Cryptographic pole data)
  8. Output = Transmit (Synchronized Cryptographic sign data,
Cryptographic pole data)
```

Turning to FIG. 5B, method 550 for a cryptographic reception operation for a vehicle-based receiver system is shown, as described above. At 562, the method 550 includes detecting and recognizing the traffic sign and pole using the camera of the vehicle. The capture of the traffic sign and pole image may be performed as described above with respect to the operation of cameras 214 of FIG. 2 and/or the image capture at 310 of method 300 of FIG. 3. Upon detecting the traffic sign and pole, the detected sign may recognized via a CVTSR module (e.g., as described above with respect to CVTSR module 216 of FIG. 2 and/or the recognition operation at 312 of method 300 of FIG. 3). In some examples, the detected pole may be recognized using the CVSTR module, and thus, the detection and recognition of traffic pole may be performed in conjunction with the detection and recognition of traffic sign discussed at steps 502, 504, and 506 of FIG. 5A.

Further, at 562, the method 550 includes obtaining pole location information using vehicle navigation system. Pole location information is the referring pole location information, and thus may be obtained similar to obtaining referring pole location information using vehicle navigation system as described with respect to 362 above. This includes determining a current travelling lane of the vehicle and navigational coordinates of the vehicle. Further, based on the travelling lane information and navigational coordinates of the vehicle, the referring pole location information for a referring pole that refers to the current travelling lane and navigational coordinates of the vehicle may be obtained. While the present example method 550 shows obtaining referring pole location information after detecting and the traffic pole and its associated sign via the camera, the referring pole location information may be obtained independent of camera detection. For example, traffic pole location information including geographical coordinates of a plurality of traffic pole and a referring lane information (or referring lanes) that each traffic pole is intended to direct traffic may be stored in a navigational database coupled to the vehicle navigational system. As the vehicle is travelling and approaching an intersection where a traffic pole referring to the current travelling lane is located, based on the current geographical coordinates of the vehicle and current travelling lane information and the traffic pole location information in the navigational database, the vehicle navigation system may obtain the referring pole information that pertains to the current travelling lane and geographical coordinates of the vehicle. This referring pole information is based on information from the traffic pole database, such as traffic pole and sign database 302 that is managed and updated by an official authority, and thus provides information about the referring traffic pole that refers to the current travel lane and that must be considered by the vehicle in the travelling lane.

Upon obtaining referring pole location information, the method 550 proceeds to 566. At 566, the method 550 includes importing a corresponding private key for the referring pole. Importing a corresponding private key for the referring pole may be similar to importing a corresponding pole private key for recognized sign at 510 of FIG. 5A, and thus, may include accessing the RPBM that is local to the vehicle and stores a plurality of private keys for decrypting received traffic pole data (encrypted by a corresponding public key). Further, upon accessing the RPBM, the corresponding pole private key for the referring pole may be imported. The imported pole private key for the referring pole may be used for decrypting a cryptographic pole ID (transmitted by a traffic pole) that is received by the vehicle via the antenna and therefore used for authenticating the traffic pole by verifying, with the imported private key, if the received pole ID from the traffic pole corresponds to the referring traffic pole.

For example, unique public key/private key pairs are used in the encryption of unique IDs for different poles, thus, each unique pole ID is encrypted using a unique pole public key in the transmitter during encryption, and corresponding unique pole private keys are used in the receiver (e.g., the vehicle) to perform decryption.

Turning now to 552, the method 550 includes receiving digitally-signed cryptographic pole data via an antenna of the vehicle (e.g., the digitally-signed cryptographic data transmitted at 470 of method 400 of FIG. 4). A signature for each pole is made at the transmitter using a single private key, thus, a corresponding public key (e.g., that is part of a symmetric public/private key pair for signature verification) is used in signature verification at the receiver of the vehicle. Verifying the signature of the cryptographic pole data received at the receiver of the vehicle is similar to verifying the signature of the cryptographic sign data discussed at steps 514, 516, and 518 of FIG. 5A. Accordingly, at 554, the method includes importing (e.g., from the write protected memory of the vehicle, which has integrity check associated therewith) a signature pole public key (e.g., which is handled and/or generated via an original equipment manufacturer) for signature verification.

At 556, the method 550 includes performing signature verification on the received digitally-signed cryptographic pole data (received at 552) using the imported signature public key (imported at 554). The pole signature verification may be performed to ensure that no changes were made to the pole cryptographic data after the pole cryptographic data was signed. An example pole signature verification process may be similar to sign signature verification process, and may include decrypting the signature/digitally-signed cryptographic pole data using the imported signature pole public key to generate a decrypted hash, then performing a second computed hash of the same data (e.g., using the same hashing algorithm as the transmitter system) to determine if the second computed hash matches the received digitally-signed cryptographic pole data. A match indicates that the data was likely not tampered with, while a mismatch indicates that the data was likely compromised.

Unauthorized transmission from poles are rejected in the above signature verification, while cryptographic pole data from authorized traffic poles that are successfully verified in the above digital signature verification are passed for decryption. Accordingly, at 558, the method includes decrypting the signature-verified cryptographic pole data using the private key (imported at 566 from the RPMB based on referring pole information obtained from the vehicle navigation information) in a secured execution mode of a secured operating system in the vehicle.

Next, at 568, the method 550 includes determining whether the decryption was successful. For example, identifying successful decryption may include determining whether the private key imported at 566 was able to be used to decrypt the cryptographic pole data indicating that the correct key is retrieved from RPMB for decryption, which in turn indicates that the referring pole indicated by the vehicle navigation system corresponds to the traffic pole transmitting the cryptographic data. Said another way, successful decryption indicates that the cryptographic data received is from a traffic pole that is a referring pole intended to direct traffic for the current travelling lane. If the decryption is not successful (e.g., "NO" at 568), the method includes flagging the detected traffic pole as a rotated, as indicated at 572. The flag may be propagated to vehicle systems and/or to third-party systems (e.g., a traffic authority system) as described above with reference to the flagging at 322 of FIG. 3.

Alternatively, if the decryption is successful (e.g., "YES" at 568), the method proceeds to 570. At 570, the method 550 includes confirming that the traffic pole transmitting cryptographic data is the referring pole for the current travelling lane and geographical location of the vehicle. Upon confirming the referring pole, other cryptographic data from the referring pole, such as cryptographic sign data after verification for authenticity as described at FIG. 5A, may be considered by vehicle system (e.g., for ADAS/autonomous processing). If the decryption of the received pole ID was not successful (e.g., NO at 568), even if the associated traffic sign ID is decrypted successfully, the sign information may not be considered by the vehicle as the pole on which the associated sign is mounted does not refer to the current travelling lane.

An example of pseudo code that may represent operation at the receiver system is provided below:

//Infinite Loop
1. Referring pole identification = Vehicle navigation system (vehicle geographical coordinates, current traveling lane)
2. Received_crypto_pole_data = Receive (Transmit (Synchronized Cryptographic associated sign and pole data))
3. S.KeyPub = Import signature key (Integrity check storage (received_crypto_pole_data))
4. Encrypted Pole (ID) = Signature verification algorithm (Received_crypto_pole_data, S.KeyPub)
5. Signature verification successful
6. D.KeyPri = Import Decryption Key (Replay Protected Memory Block (referring pole))
8. Decrypt (Encrypted Pole (ID), D.KeyPri)
9. ADAS/Autonomous vehicle operation = Pass (Referring traffic pole confirmation, Decryption successful)

Non-limiting example scenarios of using the traffic pole attack detection systems of the present disclosure is provided for illustrative purposes. In an example scenario at FIG. 6A, a four-way intersection 600 is shown with traffic pole 622 referring to lane 621, traffic pole 624 referring to lane 623, traffic pole 626 referring to lane 625, and traffic pole 628 referring to lane 628. A vehicle 620 travelling on lane 621 receives cryptographic information 640 from the traffic pole 622. The cryptographic information may include cryptographic pole information of traffic pole 622 and cryptographic information of traffic sign 632 associated with the traffic pole 622. The vehicle 620 as it approaches the intersection, based on geographical coordinates of the vehicle and the travelling lane 621, may determine, via the vehicle navigation system, a referring traffic pole position information for the travelling lane 621. Simultaneously, via one or more cameras of the vehicle 620 and a CVTSR of the vehicle, the vehicle may detect and identify the traffic pole 622 and its associated sign 632. In this example, all the traffic poles are positioned to refer to their respective lanes (that is, there has been no attack/change on any of the poles in the intersection 600 that may cause the traffic poles to refer to a non-referring lane), and as such, the referring pole position information may be used by the vehicle computing system to import a private key that may be subsequently used to successfully decrypt cryptographic data of the traffic pole 622. Thus, the vehicle may confirm that the traffic pole 622 is the referring pole for the travelling lane 622, and may proceed to use the cryptographic information (e.g., cryptographic sign information of the sign 632) for sign verification and subsequent vehicle processing (e.g., ADAS/autonomous vehicle operation processing). It will be appreciated that decryption of cryptographic pole data will be performed after signature verification, as discussed above with respect to FIG. 5B. In some examples, the cryptographic sign information and the cryptographic pole information may be verified simultaneously or in any order, however any verified cryptographic sign may be used for subsequent vehicle processing responsive to the cryptographic pole information verification (that is, when the cryptographic information is verified to come from the referring pole (e.g., pole 622) for the travelling lane (e.g., lane 621 in this example)).

In some examples, the non-referring poles 624, 626, and 628 with respect to lane 621 may also transmit and/or broadcast their respective pole and sign cryptographic information, which may be received by the vehicle 620. However, the private key imported based on the referring pole position information determined by the vehicle for the lane 621 may not successfully decrypt cryptographic pole information from the non-referring poles 624, 626, and 628, and therefore, cryptographic sign and pole information from the non-referring traffic poles 624, 626, and 628 may be ignored by the vehicle 620 travelling in the lane 621. In this way, cryptographic information from the referring pole 622 for the lane 621 may be selectively identified by the vehicle 620 travelling on the lane 621 and used for associated sign (632) verification and subsequent vehicle processing.

Figure 6B:
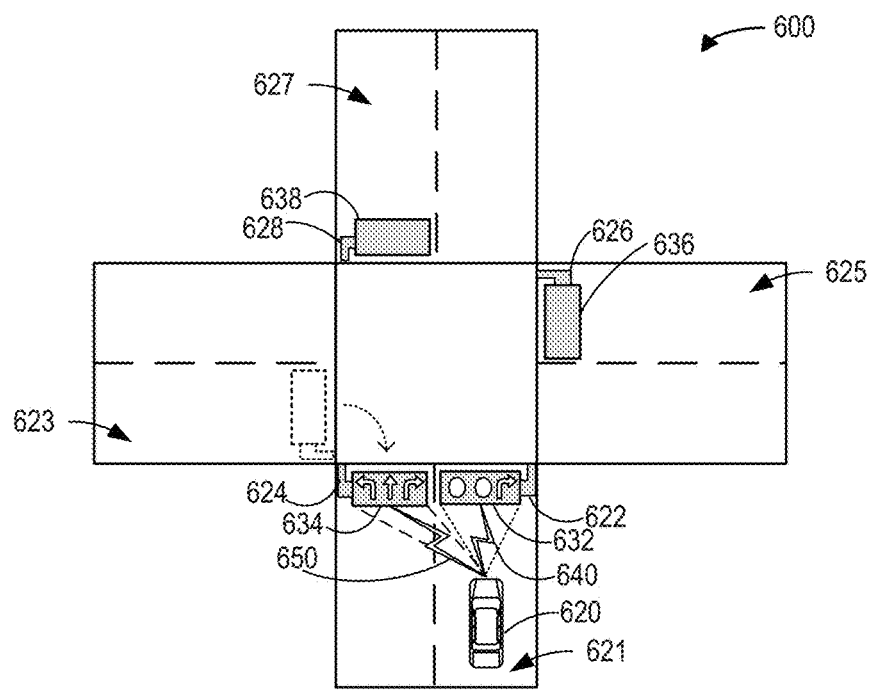

Another example scenario for the intersection 600 is shown at FIG. 6B. In this scenario, the traffic pole 624 is rotated such that the traffic pole 624 and its associated sign 634 are detected and recognized by one or more cameras and the CVTSR of the vehicle. Further, the traffic pole 622 referring to lane 621 is also detected along with its associated sign 632. Furthermore, cryptographic information 640 from traffic pole 622 as well as cryptographic information 650 from traffic pole 634 is received at the vehicle 620. Further still, cryptographic verification of the traffic signs 634 and 632 by the vehicle may indicate that both the signs are authentic (that is, signature verification and decryption are successful). In order to determine which traffic sign (634 or 632) to consider for subsequent vehicle operation, the vehicle 620 may identify which traffic pole is the referring pole for the travelling lane 621 and thereby, identify traffic pole that has been rotated. Accordingly, the vehicle 620 may use a pole position information of the referring pole (identified using the vehicle navigation system) to import the private key for the referring pole for the travelling lane 621 as described above at FIG. 6A. The private key imported the vehicle 620 may be used to successfully decrypt cryptographic pole data transmitted from the referring pole and received at the vehicle 620. Thus, cryptographic pole information included in cryptographic information 640 from pole 622 is successfully decrypted by the imported private key whereas, the cryptographic pole information for pole 624 included in cryptographic information 650 from pole 624 is not successfully decrypted by the private key. Thus, pole 624 may be flagged as rotated. As a result, responsive to detecting and recognizing one or more poles and associated signs via camera and CVTSR of the vehicle, when recognized traffic pole decryption is unsuccessful with private key obtained using the vehicle navigation system, the recognized traffic pole whose signature-verified decryption was unsuccessful may be flagged as rotated.

In some examples, the non-referring poles 626 and 628 with respect to lane 621 that are not rotated may also transmit and/or broadcast their respective pole and sign cryptographic information, which may be received by the vehicle 620. However, the private key imported based on the referring pole position information determined by the vehicle for the lane 621 may not successfully decrypt cryptographic pole information from the non-referring poles 626, and 628 and therefore, cryptographic sign and pole information from the non-referring traffic poles 626, and 628 may be ignored by the vehicle 620 travelling in the lane 621 but not flagged as rotated as the vehicle camera does not recognize the traffic sign 636 and 638 associated with non-referring poles 626 and 628 (e.g., due to the signs 636 and 638 not facing the vehicle and therefore the signals are not in the field of view of the vehicle camera). As discussed above, pole 624 may be identified as rotated. In this way, cryptographic information from the referring pole 622 for the lane 621 may be selectively identified by the vehicle 620 travelling on the lane 621 and used for associated sign (632) verification and subsequent vehicle processing.

Figure 6C:
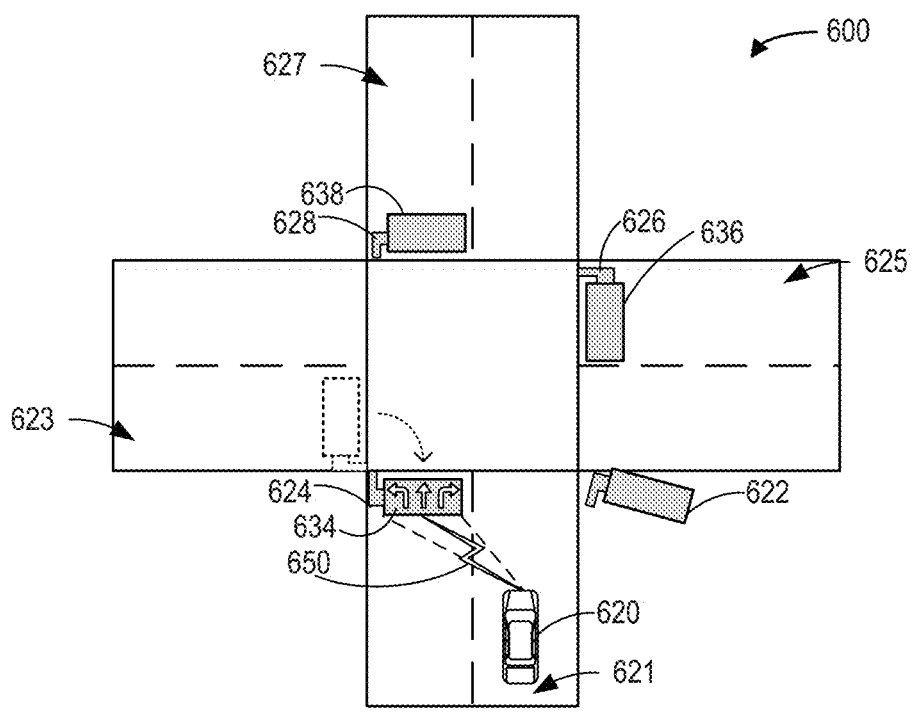

Yet another example scenario is depicted at FIG. 6C, wherein traffic pole 622 and its associated sign 632 are knocked down and traffic pole 624 and its associated sign 634 are rotated towards lane 621. The vehicle 620 may identify and recognize traffic pole 624 and its associated sign. Further, the vehicle 620 may receive cryptographic information 650 from traffic pole 624 and may import the private key corresponding to the referring pole for the travelling lane 621 as discussed above. However, the private key may not be used to successfully decrypt the cryptographic pole information (for pole 624) included in the cryptographic information 650, and as a result, the pole 624 may be flagged as rotated and the cryptographic information 650 may not be considered for any additional sign verification and/or processing for vehicle operation (e.g., ADAS/autonomous operation). Furthermore, in response to not identifying and/or recognizing, via camera and/or CVTSR, the referring pole for lane 621 at the expected geographical area, and/or not receiving broadcast from the referring pole in the expected geographical area, the vehicle computing system may perform one or more vehicle operations (e.g., reduce speed at the intersection and utilize computer vision and/or other sensors (e.g., LIDAR) to detect objects with respect to vehicle travel path and operate accordingly)

The traffic pole attack detection systems of the present disclosure utilizes both computer vision-based recognition, navigation based pole location detection, and cryptography-based verification to authenticate detected traffic signals and poles using multiple layers of security. The above-described approaches have a technical effect of increasing accuracy and reliability of traffic sign detection in the vehicle, which in turn increases accuracy and reliability of vehicle control based on detected traffic signs. The above-described approaches have another technical effect of detecting misdirecting traffic poles, which further increases accuracy and reliability of traffic sign detection in the vehicle. Consequently, by detecting misdirecting traffic poles, accuracy and reliability of vehicle control is further increased.

As described above, the described methods may be performed, at least in part, within a vehicle using an in-vehicle computing system as an emergency vehicle alert system.

FIG. 7 shows an example partial view of one type of environment for an emergency vehicle alert system: an interior of a cabin 700 of a vehicle 702, in which a driver and/or one or more passengers may be seated. Vehicle 702 of FIG. 7 may include and/or be an example of vehicle 102 of FIG. 1 and/or vehicle 212 of FIG. 2.

As shown, an instrument panel 706 may include various displays and controls accessible to a driver (also referred to as the user) of vehicle 702. For example, instrument panel 706 may include a touch screen 708 of an in-vehicle computing system 709 (e.g., an infotainment system), an audio system control panel, and an instrument cluster 710.

In some embodiments, one or more hardware elements of in-vehicle computing system 709, such as touch screen 708, a display screen, various control dials, knobs and buttons, memory, processor(s), and any interface elements (e.g., connectors or ports) may form an integrated head unit that is installed in instrument panel 706 of the vehicle. The head unit may be fixedly or removably attached in instrument panel 706. In additional or alternative embodiments, one or more hardware elements of the in-vehicle computing system may be modular and may be installed in multiple locations of the vehicle.

The cabin 700 may include one or more sensors for monitoring the vehicle, the user, and/or the environment. For example, the cabin 700 may include one or more microphones to receive user input in the form of voice commands and/or to measure ambient noise in the cabin 700 or outside of the vehicle, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 650 and/or mobile device 728.

Cabin 700 may also include one or more user objects, such as mobile device 728, that are stored in the vehicle before, during, and/or after travelling. The mobile device 728 may include a smart phone, a tablet, a laptop computer, a portable media player, and/or any suitable mobile computing device. The mobile device 728 may be connected to the in-vehicle computing system via communication link 730. The communication link 730 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 728 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 730 may provide sensor and/or control signals from various vehicle systems (such as vehicle audio system, sensor subsystem, etc.) and the touch screen 708 to the mobile device 728 and may provide control and/or display signals from the mobile device 728 to the in-vehicle systems and the touch screen 608. The communication link 730 may also provide power to the mobile device 728 from an in-vehicle power source in order to charge an internal battery of the mobile device.

In-vehicle computing system 709 may also be communicatively coupled to additional devices operated and/or accessed by the user but located external to vehicle 702, such as one or more external devices 750. In the depicted embodiment, external devices are located outside of vehicle 702 though it will be appreciated that in alternate embodiments, external devices may be located inside cabin 700. The external devices may include a server computing system, personal computing system, portable electronic device, electronic wrist band, electronic head band, portable music player, electronic activity tracking device, pedometer, smartwatch, GPS system, etc. External devices 750 may be connected to the in-vehicle computing system via communication link 736 which may be wired or wireless, as discussed with reference to communication link 730, and configured to provide two-way communication between the external devices and the in-vehicle computing system. For example, external devices 750 may include one or more sensors and communication link 736 may transmit sensor output from external devices 750 to in-vehicle computing system 709 and touch screen 708. External devices 750 may also store and/or receive information regarding navigational map data, image feature mapping data, etc. and may transmit such information from the external devices 750 to in-vehicle computing system 709 and/or touch screen 708.

In-vehicle computing system 709 may analyze the input received from external devices 750, mobile device 728, and/or other input sources and provide output via touch screen 708 and/or speakers 712, communicate with mobile device 728 and/or external devices 750, and/or perform other actions based on the assessment. In some embodiments, all or a portion of the assessment may be performed by the mobile device 728 and/or the external devices 750. In some embodiments, the external devices 750 may include in-vehicle computing devices of another vehicle.

In some embodiments, one or more of the external devices 750 may be communicatively coupled to in-vehicle computing system 709 indirectly, via mobile device 728 and/or another of the external devices 750. For example, communication link 736 may communicatively couple external devices 750 to mobile device 728 such that output from external devices 750 is relayed to mobile device 728. Data received from external devices 750 may then be aggregated at mobile device 728 with data collected by mobile device 728, the aggregated data then transmitted to in-vehicle computing system 709 and touch screen 708 via communication link 730. Similar data aggregation may occur at a server system and then transmitted to in-vehicle computing system 709 and touch screen 708 via communication link 736/730.

FIG. 7 shows a block diagram of an in-vehicle computing system 800 configured and/or integrated inside vehicle 801. In-vehicle computing system 800 may be an example of in-vehicle computing system 709 of FIG. 7 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 801 in order to enhance an in-vehicle experience for a driver and/or a passenger.

In-vehicle computing system 800 may include one or more processors including an operating system processor 814 and an interface processor 820. Operating system processor 814 may execute an operating system on the in-vehicle computing system, and control input/output, display, playback, and other operations of the in-vehicle computing system. Interface processor 820 may interface with a vehicle control system 830 via an intra-vehicle communication module 822.

Intra-vehicle communication module 822 may output data to other vehicle systems 831 and vehicle control elements 861, while also receiving data input from other vehicle components and systems 831, 861, e.g., by way of vehicle control system 830. When outputting data, intra-vehicle communication module 822 may provide a signal via a bus corresponding to any status of the vehicle, the vehicle surroundings (e.g., as measured by one or more microphones or cameras mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system may retrieve from the engine CAN bus the current speed of the vehicle estimated by the wheel sensors, a current location of the vehicle provided by the GPS sensors, and a current trajectory of the vehicle provided by one or more inertial measurement sensors in order to determine an estimated path of the vehicle. In addition, other interfacing means such as Ethernet may be used as well without departing from the scope of this disclosure.

A non-volatile storage device 808 may be included in in-vehicle computing system 800 to store data such as instructions executable by processors 814 and 820 in non-volatile form. The storage device 808 may store application data to enable the in-vehicle computing system 800 to perform any of the above-described methods and/or to run an application for connecting to a cloud-based server and/or collecting information for transmission to the cloud-based server. Connection to a cloud-based server may be mediated via extra-vehicle communication module 824. The application may retrieve information gathered by vehicle systems/sensors, input devices (e.g., user interface 818), devices in communication with the in-vehicle computing system (e.g., a mobile device connected via a Bluetooth link), etc. In-vehicle computing system 800 may further include a volatile memory 816. Volatile memory 816 may be random access memory (RAM). Non-transitory storage devices, such as non-volatile storage device 808 and/or volatile memory 816, may store instructions and/or code that, when executed by a processor (e.g., operating system processor 814 and/or interface processor 820), controls the in-vehicle computing system 800 to perform one or more of the actions described in the disclosure.

A microphone 802 may be included in the in-vehicle computing system 800 to measure ambient noise in the vehicle, to measure ambient noise outside the vehicle, etc. One or more additional sensors may be included in and/or communicatively coupled to a sensor subsystem 810 of the in-vehicle computing system 800. For example, the sensor subsystem 810 may include and/or be communicatively coupled to a camera, such as a rear view camera for assisting a user in parking the vehicle, a cabin camera for identifying a user, and/or a front view camera to assess quality of the route segment ahead. The above-described cameras may also be used to provide images to a computer vision-based traffic sign detection module, as described above. Sensor subsystem 810 of in-vehicle computing system 800 may communicate with and receive inputs from various vehicle sensors and may further receive user inputs. While certain vehicle system sensors may communicate with sensor subsystem 810 alone, other sensors may communicate with both sensor subsystem 810 and vehicle control system 830, or may communicate with sensor subsystem 810 indirectly via vehicle control system 830. Sensor subsystem 810 may serve as an interface (e.g., a hardware interface) and/or processing unit for receiving and/or processing received signals from one or more of the sensors described in the disclosure.

A navigation subsystem 811 of in-vehicle computing system 800 may generate and/or receive navigation information such as location information (e.g., via a GPS sensor and/or other sensors from sensor subsystem 810), route guidance, traffic information, point-of-interest (POI) identification, and/or provide other navigational services for the driver. The navigation subsystem 811 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 811 may communicate with motion and rotation sensors included in the sensor subsystem 810. Alternatively, the navigation subsystem 811 may include motion and rotation sensors and determine the movement and rotation based on the output of these sensors. Navigation subsystem 811 may transmit data to, and receive data from a cloud-based server and/or external navigation service via extra-vehicle communication module 824.

During vehicle operation, the navigation sub-system may obtain via the GPS sensor and/or other sensors of the vehicle system, location information of the vehicle as discussed above and a current travelling lane information of the vehicle. Based on the location information and travelling lane information, the navigation sub-system may identify a referring traffic pole for the current travelling lane. The in-vehicle computing system may then access an access replay protected memory block of the vehicle and import a private key corresponding to the identified referring traffic pole. The private key of the identified referring traffic pole may then be used to decrypt cryptographic pole information received at an antenna of the vehicle from a prospective referring traffic pole transmitting/broadcasting antenna, such as antenna 208 at FIG. 2. The in-vehicle computing system 700 may also access an access write protected memory of the vehicle to import a public key for verifying a signature of the cryptographic pole information (e.g., to verify that no changes were made to the data after the cryptographic pole information was signed). Upon verifying the signature of the received cryptographic pole information, the in-vehicle computing system may perform, in a secured execution environment, decryption of the cryptographic pole data with the private key imported for the identified referring pole. If the decryption is successful, the prospective referring pole is the referring traffic pole for the current travelling lane and the other cryptographic information (e.g., cryptographic sign information) from an antenna of the confirmed referring traffic pole may be considered for subsequent vehicle operation after sign verification as discussed herein.

External device interface 812 of in-vehicle computing system 800 may be coupleable to and/or communicate with one or more external devices 840 located external to vehicle 801. While the external devices are illustrated as being located external to vehicle 801, it is to be understood that they may be temporarily housed in vehicle 801, such as when the user is operating the external devices while operating vehicle 801. In other words, the external devices 840 are not integral to vehicle 801. The external devices 840 may include a mobile device 842 (e.g., connected via a Bluetooth, NFC, WIFI direct, or other wireless connection) or an alternate Bluetooth-enabled device 852. Mobile device 842 may be a mobile phone, smart phone, wearable devices/sensors that may communicate with the in-vehicle computing system via wired and/or wireless communication, or other portable electronic device(s). Other external devices include external services 846. For example, the external devices may include extra-vehicular devices that are separate from and located externally to the vehicle. Still other external devices include external storage devices 854, such as solid-state drives, pen drives, USB drives, etc. External devices 840 may communicate with in-vehicle computing system 800 either wirelessly or via connectors without departing from the scope of this disclosure. For example, external devices 840 may communicate with in-vehicle computing system 800 through the external device interface 812 over network 860, a universal serial bus (USB) connection, a direct wired connection, a direct wireless connection, and/or other communication link.

One or more applications 844 may be operable on mobile device 842. As an example, mobile device application 844 may be operated to monitor an environment of the vehicle (e.g., collect audio and/or visual data of an environment of the vehicle) and/or to process audio and/or visual data received from vehicle sensors. The collected/processed data may be transferred by application 844 to external device interface 812 over network 860. Likewise, one or more applications 848 may be operable on external services 846. As an example, external services applications 848 may be operated to aggregate and/or analyze data from multiple data sources. For example, external services applications 848 may aggregate data from the in-vehicle computing system (e.g., sensor data, log files, user input, etc.), etc. The collected data may be transmitted to another device and/or analyzed by the application to determine a location of an emergency vehicle and/or to determine a suggested course of action for avoiding interference with the emergency vehicle.

Vehicle control system 830 may include controls for controlling aspects of various vehicle systems 831 involved in different in-vehicle functions. These may include, for example, controlling aspects of vehicle audio system 832 for providing audio output to the vehicle occupants. Audio system 832 may include one or more acoustic reproduction devices including electromagnetic transducers such as speakers. In some examples, the in-vehicle computing system may be the only audio source for the acoustic reproduction device or there may be other audio sources that are connected to the audio reproduction system (e.g., external devices such as a mobile phone) to produce audio outputs, such as one or more of the audible alerts described above. The connection of any such external devices to the audio reproduction device may be analog, digital, or any combination of analog and digital technologies.

Vehicle control system 830 may also include controls for adjusting the settings of various vehicle controls 861 (or vehicle system control elements) related to the engine and/or auxiliary elements within a cabin of the vehicle, such as steering controls 862, brake controls 863, lighting controls 864 (e.g., cabin lighting, external vehicle lighting, light signals). For example, the vehicle control system 830 may include controls for adjusting the vehicle controls 861 to present one or more of the above-described alerts (e.g., adjusting cabin lighting, automatically controlling steering or braking to perform a maneuver in accordance with a detected traffic sign, etc.). Vehicle controls 861 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system (e.g., to provide the above-described alert). The control signals may also control audio output (e.g., an audible alert) at one or more speakers of the vehicle's audio system 832.

In-vehicle computing system 800 may further include an antenna(s) 806, which may be communicatively coupled to external device interface 812 and/or extra-vehicle communication module 824. The in-vehicle computing system may receive positioning signals such as GPS signals and/or wireless commands via antenna(s) 806 or via infrared or other mechanisms through appropriate receiving devices.

One or more elements of the in-vehicle computing system 800 may be controlled by a user via user interface 818. User interface 818 may include a graphical user interface presented on a touch screen, such as touch screen 608 of FIG. 6, and/or user-actuated buttons, switches, knobs, dials, sliders, etc. A user may also interact with one or more applications of the in-vehicle computing system 800 and mobile device 842 via user interface 818. Notifications and other messages (e.g., alerts), as well as navigational assistance, may be displayed to the user on a display of the user interface. User preferences/information and/or responses to presented alerts may be performed via user input to the user interface.

The disclosure also provides support for a traffic pole detection system in a vehicle, the traffic pole detection system comprising: a navigation sensor, a communication system, a processor, and a storage device storing instructions in non-transitory memory, the instructions executable by the processor to: determine a current location information of the vehicle, the current location information including a lane information for a travelling lane that the vehicle is travelling on, obtain a referring traffic pole information for the travelling lane based on the current location information of the vehicle, receive cryptographic pole data via the communication system from a transmitter associated with a prospective referring traffic pole including an associated traffic sign mounted thereon, the cryptographic pole data including a cryptographic representation of the prospective referring traffic pole, and selectively control one or more vehicle systems of the vehicle based on cryptographic verification of the prospective referring pole using the obtained referring traffic pole information. In a first example of the system, the cryptographic representation of the prospective referring traffic pole includes a unique pole ID associated with the prospective referring traffic pole, the unique pole ID encrypted using a first public key. In a second example of the system, optionally including the first example, the cryptographic representation of the prospective referring traffic pole is digitally signed with a first private key that is accessible by the transmitter associated with the prospective referring traffic pole. In a third example of the system, optionally including the first and second examples, the cryptographic verification of the prospective referring pole includes obtaining a second private key associated with the referring traffic pole, the second private key accessible by the processor, and decrypting the received cryptographic pole data using the second private key. In a fourth example of the system, optionally including the first through third examples, the second private key is stored in a replay protected memory block of the storage device and wherein the cryptographic pole data is broadcast wirelessly from an antenna associated with the prospective traffic pole. In a fifth example of the system, optionally including the first through fourth examples, the cryptographic verification of the prospective referring pole includes performing a verification of a digital signature of the cryptographic pole data using a second public key, the second public key is retrieved based on an association of the first private key with a stored ID that is stored locally in the vehicle and that corresponds to the prospective referring traffic pole. In a sixth example of the system, optionally including the first through fifth examples, the prospective traffic pole is determined to be cryptographically verified to be the referring traffic pole responsive to successfully decrypting the cryptographic pole data to retrieve the unique pole ID using the second private key corresponding to the referring traffic pole. In a seventh example of the system, optionally including the first through sixth examples, the prospective referring traffic is determined to be cryptographically verified to be the referring traffic pole further responsive to determining that the unique pole ID retrieved via decrypting the cryptographic pole data with the second private key is the same as the stored pole ID associated with the prospective referring traffic pole. In an eighth example of the system, optionally including the first through seventh examples, selectively controlling one or more vehicle systems of the vehicle based on the cryptographic verification of the prospective referring traffic pole comprises adjusting operation of the vehicle to adhere to a regulation associated with the traffic sign mounted on the prospective referring traffic pole responsive to determining that the prospective referring traffic pole is cryptographically verified to be the referring traffic pole and not adjusting operation of the vehicle based on the prospective referring traffic pole responsive to determining that the prospective referring traffic pole is not cryptographically verified to be the referring traffic pole.

The disclosure also provides support for a method of verifying a traffic pole with a vehicle, the method comprising: determining a current location information of the vehicle, obtaining a referring traffic pole information of a referring traffic pole based on the current location information of the vehicle, receiving cryptographic information wirelessly via a communication system of the vehicle from a transmitter associated with the traffic pole having a traffic sign mounted thereon, the cryptographic information including a pole cryptographic representation of the traffic pole and a sign cryptographic representation of the traffic sign, and selectively controlling one or more vehicle systems of the vehicle based on a first cryptographic verification of the traffic pole using the pole cryptographic representation and the referring traffic pole information. In a first example of the method, the pole cryptographic representation comprises a unique pole ID associated with the traffic pole and wherein the sign cryptographic representation comprises a unique sign ID associated with the traffic sign mounted on the traffic pole. In a second example of the method, optionally including the first example, the cryptographic information includes a first encryption of the unique pole ID, which is encrypted using a first pole public key of an encryption algorithm, and wherein the cryptographic information further includes a second encryption of the unique sign ID, which is encrypted using a first sign public key of the encryption algorithm. In a third example of the method, optionally including the first and second examples, the cryptographic information further includes an assembly of the first encryption of the unique pole ID with a first digital signature, and wherein the cryptographic information further includes an assembly of the second encryption of the unique sign ID with a second digital signature, each of the first digital signature and the second digital signature being generated by applying a cryptographic signature algorithm on the first encryption of the unique pole ID using a first pole private key and on the second encryption of the unique sign ID using a second sign private key respectively. In a fourth example of the method, optionally including the first through third examples, the first cryptographic verification of the traffic pole includes obtaining a second pole private key associated with the referring pole, the second pole private key accessible by a processor of the vehicle, and decrypting the first encryption of the unique pole ID using the second pole private key, and wherein the first cryptographic verification of the traffic pole further includes performing a signature verification on the pole cryptographic representation using a second pole public key of the encryption algorithm, the second pole public key retrieved from an integrity check storage of the vehicle. In a fifth example of the method, optionally including the first through fourth examples, the traffic pole is determined to be cryptographically verified to be the referring pole responsive to: successfully decrypting the first encryption of the unique pole ID using the second pole private key corresponding to the referring traffic pole, and successfully verifying the first signature of the cryptographic information using the second pole public key. In a sixth example of the method, optionally including the first through fifth examples, the method further comprises: responsive to successfully decrypting the first encryption of the unique pole ID, performing a second cryptographic verification of the traffic sign mounted on the cryptographically verified traffic pole, and responsive to successfully performing the second cryptographic verification, adjusting operation of the vehicle to adhere to a regulation associated with the traffic sign, and responsive to determining that the first encryption of the unique pole ID is not successfully decrypted, not performing the second cryptographic verification of the traffic sign and not adjusting operation of the vehicle based on the traffic sign.

The disclosure also provides support for a method for identifying a referring traffic pole among two or more traffic poles in a vehicle's environment, the method comprising: obtaining a referring traffic pole location information based on a location information of the vehicle and a travelling lane information of the vehicle from a navigation system of the vehicle, obtaining a private key of the referring traffic pole based on the referring traffic pole location information, receiving corresponding cryptographic pole data from each of the two or more traffic poles via a wireless communication system of the vehicle, decrypting each of the corresponding cryptographic pole data using the private key, identifying the referring pole for the vehicle based on successful decryption of cryptographic pole data from one of the two or more traffic poles, and selectively controlling one or more vehicle systems of the vehicle based on identified referring pole. In a first example of the method, the method further comprises: during a first condition, wherein a referring traffic sign mounted on the identified referring pole is detected and recognized by an image sensor of the vehicle, receiving a cryptographic representation of the referring sign from a transmitter associated with the referring traffic pole along with a cryptographic representation of the referring traffic pole, and selectively controlling the one or more vehicle systems of the vehicle based on a cryptographic verification of the recognized referring sign using the cryptographic representation of the referring sign, and during a second condition, wherein a second traffic sign is detected and recognized by the image sensor in addition to the referring traffic sign, selectively controlling the one or more vehicle systems of the vehicle based on a cryptographic verification of the recognized referring sign using the cryptographic representation of the referring sign and flagging a second traffic pole on which the second sign is mounted as rotated, wherein the second traffic pole is from among the two or more traffic poles not cryptographically verified as the referring traffic pole. In a second example of the method, optionally including the first example, selectively controlling one or more vehicle systems of the vehicle based on the cryptographic verification of the recognized referring sign comprises adjusting operation of the vehicle to adhere to a regulation associated with the referring traffic sign. In a third example of the method, optionally including the first and second examples, identifying the referring pole for the vehicle is further based on performing a signature verification on the cryptographic pole data of the identified referring pole using a public key retrieved from an integrity check storage of the vehicle and associated with the referring pole.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 709 and/or 800 described with reference to FIGS. 7 and 8. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A traffic pole detection system in a vehicle, the traffic pole detection system comprising:
 a navigation sensor;
 a communication system;
 a processor; and
 a storage device storing instructions in non-transitory memory, the instructions executable by the processor to:
  identify a prospective referring traffic pole, wherein identifying the referring traffic pole comprises imaging an environment of the vehicle using cameras mounted in or on the vehicle, detecting traffic poles present in images from the cameras, determining a current location information of the vehicle, the current location information including a lane information for a travelling lane that the vehicle is travelling on, obtaining a referring traffic pole information for the travelling lane based on the current location information of the vehicle, and matching the detected traffic poles to the referring traffic pole information based on an amount of similarity to one or more parameters of the referring traffic pole information;
  responsive to identifying the prospective referring traffic pole, receive cryptographic pole data via the communication system from a transmitter associated with the prospective referring traffic pole including an associated traffic sign mounted thereon, the cryptographic pole data including a cryptographic representation of the prospective referring traffic pole; and
  selectively control one or more vehicle systems of the vehicle based on cryptographic verification of the prospective referring pole using the obtained referring traffic pole information.

2. The traffic pole detection system of claim 1, wherein the cryptographic representation of the prospective referring traffic pole includes a unique pole ID associated with the prospective referring traffic pole, the unique pole ID encrypted using a first public key.

3. The traffic pole detection system of claim 2, wherein the cryptographic representation of the prospective referring traffic pole is digitally signed with a first private key that is accessible by the transmitter associated with the prospective referring traffic pole.

4. The traffic pole detection system of claim 3, wherein the cryptographic verification of the prospective referring pole includes obtaining a second private key associated with the referring traffic pole, the second private key accessible by the processor; and decrypting the received cryptographic pole data using the second private key.

5. The traffic pole detection system of claim 4, wherein the second private key is stored in a replay protected memory block of the storage device and wherein the cryptographic pole data is broadcast wirelessly from an antenna associated with the prospective traffic pole.

6. The traffic pole detection system of claim 3, wherein the cryptographic verification of the prospective referring pole includes performing a verification of a digital signature of the cryptographic pole data using a second public key, the second public key is retrieved based on an association of the first private key with a stored ID that is stored locally in the vehicle and that corresponds to the prospective referring traffic pole.

7. The traffic sign detection system of claim 4, wherein the prospective traffic pole is determined to be cryptographically verified to be the referring traffic pole responsive to successfully decrypting the cryptographic pole data to retrieve the unique pole ID using the second private key corresponding to the referring traffic pole.

8. The traffic sign detection system of claim 7, wherein the prospective referring traffic pole is determined to be cryptographically verified to be the referring traffic pole further responsive to determining that the unique pole ID retrieved via decrypting the cryptographic pole data with the second private key is the same as the stored pole ID associated with the prospective referring traffic pole.

9. The traffic sign detection system of claim 1, wherein selectively controlling one or more vehicle systems of the vehicle based on the cryptographic verification of the prospective referring traffic pole comprises adjusting operation of the vehicle to adhere to a regulation associated with the traffic sign mounted on the prospective referring traffic pole responsive to determining that the prospective referring traffic pole is cryptographically verified to be the referring traffic pole and not adjusting operation of the vehicle based on the prospective referring traffic pole responsive to determining that the prospective referring traffic pole is not cryptographically verified to be the referring traffic pole.

10. A method of verifying a traffic pole with a vehicle, the method comprising:
- identifying a prospective referring traffic pole, wherein identifying the referring traffic pole comprises imaging an environment of the vehicle using cameras mounted in or on the vehicle, detecting traffic poles present in images from the cameras, determining a current location information of the vehicle, obtaining a referring traffic pole information of a referring traffic pole based on the current location information of the vehicle, and matching the detected traffic poles to the referring traffic pole information based on an amount of similarity to one or more parameters of the referring traffic pole information;
- responsive to identifying the prospective referring traffic pole, receiving cryptographic information wirelessly via a communication system of the vehicle from a transmitter associated with the traffic pole having a traffic sign mounted thereon, the cryptographic information including a pole cryptographic representation of the traffic pole and a sign cryptographic representation of the traffic sign; and
- selectively controlling one or more vehicle systems of the vehicle based on a first cryptographic verification of the traffic pole using the pole cryptographic representation and the referring traffic pole information.

11. The method of claim 10, wherein the pole cryptographic representation comprises a unique pole ID associated with the traffic pole and wherein the sign cryptographic representation comprises a unique sign ID associated with the traffic sign mounted on the traffic pole.

12. The method of claim 11, wherein the cryptographic information includes a first encryption of the unique pole ID, which is encrypted using a first pole public key of an encryption algorithm; and wherein the cryptographic information further includes a second encryption of the unique sign ID, which is encrypted using a first sign public key of the encryption algorithm.

13. The method of claim 12, wherein the cryptographic information further includes an assembly of the first encryption of the unique pole ID with a first digital signature; and wherein the cryptographic information further includes an assembly of the second encryption of the unique sign ID with a second digital signature, each of the first digital signature and the second digital signature being generated by applying a cryptographic signature algorithm on the first encryption of the unique pole ID using a first pole private key and on the second encryption of the unique sign ID using a second sign private key respectively.

14. The method of claim 13, wherein the first cryptographic verification of the traffic pole includes obtaining a second pole private key associated with the referring pole, the second pole private key accessible by a processor of the vehicle; and decrypting the first encryption of the unique pole ID using the second pole private key; and wherein the first cryptographic verification of the traffic pole further includes performing a signature verification on the pole cryptographic representation using a second pole public key of the encryption algorithm, the second pole public key retrieved from an integrity check storage of the vehicle.

15. The method of claim 14, wherein the traffic pole is determined to be cryptographically verified to be the referring pole responsive to:
- successfully decrypting the first encryption of the unique pole ID using the second pole private key corresponding to the referring traffic pole, and
- successfully verifying the first signature of the cryptographic information using the second pole public key.

16. The method of claim 15, further comprising, responsive to successfully decrypting the first encryption of the unique pole ID, performing a second cryptographic verification of the traffic sign mounted on the cryptographically verified traffic pole; and responsive to successfully performing the second cryptographic verification, adjusting operation of the vehicle to adhere to a regulation associated with the traffic sign; and responsive to determining that the first encryption of the unique pole ID is not successfully decrypted, not performing the second cryptographic verification of the traffic sign and not adjusting operation of the vehicle based on the traffic sign.

17. A method for identifying a referring traffic pole among two or more traffic poles in a vehicle's environment, the method comprising:
- obtaining a referring traffic pole location information based on a location information of the vehicle and a travelling lane information of the vehicle from a navigation system of the vehicle;
- obtaining a private key of the referring traffic pole based on the referring traffic pole location information;
- receiving corresponding cryptographic pole data simultaneously from each of the two or more traffic poles via a wireless communication system of the vehicle;
- decrypting each of the corresponding cryptographic pole data using the private key;
- identifying the referring pole for the vehicle based on successful decryption of cryptographic pole data from one of the two or more traffic poles; and
- selectively controlling one or more vehicle systems of the vehicle based on identified referring pole;

flagging a second traffic pole, wherein the second traffic pole is from among the two or more traffic poles not cryptographically verified as the referring traffic pole; and in response to flagging the second traffic pole, outputting a warning on a display of the vehicle and/or automatically sending, via a communication system of the vehicle, an indication to an authority computing system.

18. The method of claim 17, wherein selectively controlling one or more vehicle systems of the vehicle based on the cryptographic verification of the recognized referring sign comprises adjusting operation of the vehicle to adhere to a regulation associated with the referring traffic sign.

19. The method of claim 18, wherein identifying the referring pole for the vehicle is further based on performing a signature verification on the cryptographic pole data of the identified referring pole using a public key retrieved from an integrity check storage of the vehicle and associated with the referring pole.

20. The method of claim 17, further comprising predicting a safety score associated with each of the identified referring pole and the second traffic pole, and adjusting vehicle operations according to the cryptographic pole data of the second traffic pole when the predicted safety score associated with the second traffic pole is higher than the predicted safety score associated with the identified referring pole.

* * * * *